US007542943B2

(12) United States Patent
Caplan et al.

(10) Patent No.: US 7,542,943 B2
(45) Date of Patent: Jun. 2, 2009

(54) COMPUTER SERVICES AND METHODS FOR COLLECTING PAYMENTS FROM AND PROVIDING CONTENT TO WEB USERS

(75) Inventors: Alan Caplan, Seattle, WA (US);
Jonathan Leblang, Atherton, CA (US);
Shaun Schooley, Orinda, CA (US);
FuMing Young, Los Altos, CA (US);
Joel R. Spiegel, Woodinville, WA (US);
Jeffrey P. Bezos, Greater Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1407 days.

(21) Appl. No.: 09/928,977

(22) Filed: Aug. 13, 2001

(65) Prior Publication Data
US 2002/0120567 A1    Aug. 29, 2002

Related U.S. Application Data

(60) Provisional application No. 60/251,437, filed on Dec. 5, 2000, provisional application No. 60/244,357, filed on Oct. 30, 2000.

(51) Int. Cl.
*G06Q 40/00* (2006.01)
(52) U.S. Cl. ............... 705/40; 705/38; 705/36; 705/35
(58) Field of Classification Search ........... 705/26, 705/35–44, 64, 14, 34
See application file for complete search history.

(56) References Cited

U.S. PATENT DOCUMENTS

| 5,570,283 | A | * | 10/1996 | Shoolery et al. ............... 705/5 |
| 5,692,132 | A | | 11/1997 | Hogan |
| 5,715,314 | A | | 2/1998 | Payne et al. |
| 5,732,400 | A | | 3/1998 | Mandler et al. |

(Continued)

FOREIGN PATENT DOCUMENTS

JP    02002092351 A    3/2002

(Continued)

OTHER PUBLICATIONS

Boston Communications Group Added to Standard & Poor's Smallcap 600 Index PR Newswire. New York: Dec. 5, 2000. p. 1.*

(Continued)

*Primary Examiner*—Frantzy Poinvil
*Assistant Examiner*—Clement Graham
(74) *Attorney, Agent, or Firm*—Knobbe, Martens, Olson & Bear LLP

(57) ABSTRACT

A network-based payment service provides functionality for site operators to add payment links or objects to their sites. When a user selects such a link or object, the payment service may charge a fee to an account of the user, and may redirect a browser of the user to content associated with the link. In some use cases, the payment service may also cause all or a portion of the fee to be divided between multiple entities or site operators; for example, a portion may be paid to an entity responsible for hosting or publishing the payment link or object, and another portion may be paid to an entity that hosts or provides the associated content.

43 Claims, 28 Drawing Sheets

U.S. PATENT DOCUMENTS

| | | | |
|---|---|---|---|
| 5,751,956 | A | 5/1998 | Kirsch |
| 5,757,917 | A | 5/1998 | Rose et al. |
| 5,794,207 | A * | 8/1998 | Walker et al. ............... 705/1 |
| 5,815,665 | A | 9/1998 | Teper et al. |
| 5,826,241 | A | 10/1998 | Stein et al. |
| 5,948,061 | A | 9/1999 | Merriman et al. |
| 5,960,411 | A | 9/1999 | Hartman et al. |
| 5,963,915 | A | 10/1999 | Kirsch |
| 5,991,740 | A | 11/1999 | Messer |
| 6,016,504 | A | 1/2000 | Arnold et al. |
| 6,029,141 | A | 2/2000 | Bezos et al. |
| 6,092,053 | A * | 7/2000 | Boesch et al. ............. 705/26 |
| 6,330,575 | B1 | 12/2001 | Moore et al. |
| 6,336,105 | B1 | 1/2002 | Conklin et al. |
| 6,442,526 | B1 * | 8/2002 | Vance et al. ............... 705/5 |
| 7,124,115 | B1 * | 10/2006 | Herzberg et al. ........... 705/64 |
| 7,356,507 | B2 | 4/2008 | Bezos et al. |
| 2001/0051875 | A1 | 12/2001 | Miller et al. |
| 2002/0016765 | A1 | 2/2002 | Sacks |
| 2002/0095372 | A1 | 7/2002 | Likourezos et al. |
| 2002/0120568 | A1 | 8/2002 | Leblang et al |
| 2002/0152163 | A1 | 10/2002 | Bezos et al. |

FOREIGN PATENT DOCUMENTS

| | | |
|---|---|---|
| WO | WO 98/58334 | 12/1998 |
| WO | WO 00/67177 A2 | 11/2000 |
| WO | WO 01/27782 A1 | 4/2001 |
| WO | WO 01/41419 A1 | 6/2001 |
| WO | WO 01/43033 A1 | 6/2001 |

OTHER PUBLICATIONS

Gralla, Preston, "How The Internet Works," Millennium Edition, Que, 1999. (Uploaded in two parts).

"*Cybercash Unveils "Instabuy.com" Website for Consumer One-Click Shopping Online,*" Instabuy Press Release Feb. 22, 1999, Printed from www.instabuy.com on Sep. 2, 1999.

"*Understanding Instabuy A Consumer And Merchant Overview,*" PDF document downloaded from www.instabuy.com on May 1999.

C. Walker, "Quick Study : Digital Wallets" printed from www.computerworld.com/home/features.nsf/all/990705qs on Sep. 2, 1999.

C. Guglielmo, "A Tale of Two One-Click Initiatives," Inter@ctive Week, dated Mar. 30, 1999.

Kelsey, J., and Schneier, B., "Electronic Commerce and the Street Performer Protocol," In the Third USENIX Workshop on Electronic Commerce Proceedings, USENIX Press, 9 pages, dated Nov. 1998 (as downloaded from www.counterpane.com/street_performer.pdf).

Cox, B., Tygar, J.D., and Sirbu, M., "Netbill Security and Transaction Protocol," In Proceedings of the First USENIX Workshop on Electronic Commerce, 13 pages, dated Jul. 1995.

Tang, L., "A Set of Protocols for Micropayments in Distributed Systems," In Proceedings of the First USENIX Workshop on Electronic Commerce, 10 pages, dated Jul. 1995.

Manasse, M., "The Millicent protocols for electronic commerce," In Proceedings of the First USENIX Workshop on Electronic Commerce, 7 pages, dated Jul. 1995.

Udell, J., "PayPal, Orbiscom, Amex—More E-Payment Alternatives," BYTE.com, dated Oct. 11, 2000 (12 pages printed from byte.com site).

Davis, J., "Content Sites Find Possible Revenue Source," Infoworld, Jan. 8, 2001, p. 31.

"Linkshare Launches Affiliates Profiling Software; First to Integrate Personalization Software Into Affiliates Program," PR Newswire Association Inc., dated Feb. 24, 1998 (2 pages).

Description in attached IDS of "Single-action purchases of items sold by other users" feature of Amazon.com web site.

Co-pending U.S. Appl. No. 09/312,309, filed May 14, 1999 by Britto, Cardwell, Young, Peddy, Blakey, Lee and Ringewald; initially assigned to Accept.Com, Inc. and subsequently acquired by Amazon.com, Inc.

Japanese-language reference titled "Easily purchasing over the internet! Rakuten Market," e-commerce 2000, 1st edition, Kohgakusha Co. Ltd., May 20, 2000, pp. 34-41, cited as referenced D6 in counterpart Japanese application No. 2002-539921 (submitted herewith with one-page summary of reference).

* cited by examiner

Manage PayPage
step one

Customize Your PayPage

Every PayPage has several features so you can tailor the PayPage to your specific needs. Click Edit in each category to customize your PayPage settings. When all your settings are correct, click Continue to preview your PayPage. See a sample PayPage.

( Continue ▶ )

1. Your Messaging (required)
Click Edit to make changes. Learn more.

| | |
|---|---|
| PayPage Description: | Welcome to my PayPage. Payment is... |
| Thank-you Message: | Thank you for visiting my PayPage. I appreciate... |
| Thank-you E-mail: | Again, thank you for visiting my PayPage. I... |

( Edit )

2. Your Title and Color Scheme (optional)
Click Edit to make changes. Learn more.

PayPage Title: [registrant's name]'s PayPage
Text Color: ▨
Background Color: ▨

( Edit )

3. Your PayPage's Image (optional)
Click Edit to make changes. Learn more.

Uploaded Image: C://mypictures/paypage.jpg ( Edit )

4. Your Payment Settings (optional)
Click Edit to make changes. Learn more.

Default Amount: $x.xx
Minimum Amount: $x.xx ( Edit )

5. Your Advanced Settings (optional)
Click Edit to make changes. Learn more.

Allow other Amazon.Com Customers to become associates for this PayPage: Yes
Your Location: Seattle
E-mail address: email@email.com
Thank-you Page URL: http://www.url.com ( Edit )

6. Your Payment Counter (optional)
Click Edit to make changes. Learn more.

Display: Number of Payments
Goal Graph: Yes
Goal Amount: $xxxx.xx ( Edit )    ( Continue ▶ )

*Manage PayPage*
step five

Preview and Install Your Pay Box
Here is a preview of the pay box you created. Now, you can either:

1. click Edit to make corrections;
2. follow the instructions to install the pay box on your website in the Install the Pay Box section below; or,
3. click Continue to save this pay box and return here later for installation instructions.

Preview of your pay box

```
Hi, Griffen McDade.
Support Phowl! Pay $1 for each
MP3 you download.
   Click to Pay!
   amazon honor system
   How do we know your name?
```

( Edit )                                                                                ( Continue ▶ )

---

Install the pay box

Please follow the directions below to install the pay box on your website. If you want more detail than the directions below provide, click the more detailed instructions link near the bottom of this page. Please click Continue when you are finished.

Here's the HTML code for your pay box:

```
<img src =
"http://www.amazon.com/exec/varzea/tipbox/A1X0XFS37WTVOF/TMLPQ4D5H3GYZ/Z01Y2455306Y5123188
.gif"usemap="#tipmap">
   <map name="tipmap">
   <area coords="40, 100, 160, 160" href="http://www.amazon.com/exec/varzea/payP2K22M0VKTMB0P?
amount=1.00">
   <area coords="23, 183, 178, 195" href="http://www.amazon.com/exec/varea/subst/financial-exchange
/help/pay-box-placement.html">
   </map>
```

Directions

- Highlight and copy the HTML code in the box above.
- Paste the copied HTML code into the appropriate place in your web page's HTML code. Your identifying information is already imbedded in the HTML.
- You don't need to copy any graphic because the HTML code already specifies the graphic you want.

FIG. 11 amazon.com

🛒 | YOUR ACCOUNT | HELP

SEARCH

Search for PayPages to Associate with. Fill in Name or Description and click Go!

Name or Description:
[Animal Society] (GO)

City: (optional)
[         ]

State: (optional)
[         ]

Top Questions

1. Who can I be an Associate of?
2. What is a Paybox?
3. How much do I earn?
4. How do I get my money?
5. How can I market a Paybox?

Associates How-To
Here's everything you'll need to become an Associate in three easy steps.

Step One: Find a PayPage
Use the Search box to the left to find PayPages to become an Associate. Search by name (example: Humane Society) or description (example: animal welfare) and optionally limit your search to a city or state. Choose a PayPage from the search results list.

Step Two: Install a Paybox on Your Website
The PayPage you're hosting offers one or more links. Choose the one that best suits your website. Based on your choice, we'll give you a few lines of HTML code (which includes the image link) to cut and paste into your site. Unsure how?

Step Three: Make Money.
Every time a visitor to your website clicks on a hosted paybox and makes a payment, you earn a commission. Learn more.

FIG. 13 amazon.com

🛒 | (YOUR ACCOUNT) | HELP

SEARCH

Search for PayPages to Associate with. Fill in Name or Description and click Go!

Name or Description:

[Animal Society] (GO)

City: (optional)

[ ]

State: (optional)

[ ]

There are 4 results for Animal Society

These people or organizations have PayPages matching your search query. Click a PayPage link to see the page as your website's visitors will see it when they click to pay. Click a paybox link to see the corresponding payboxes and choose which to install on your website.

1. The Animal Society in Pittsburgh, PA

The Pittsburgh Animal Society uses your donations to shelter hundreds of...
PayPage | Payboxes 2. The Animal Society in Seattle, WA Your donations are used to feed and shelter hundreds of animals in the Seattle...
PayPage | Payboxes 3. The Animal Society in Los Angeles, CA Your donations are used to feed and shelter hundreds of animals in the LA...
PayPage | No payboxes available at this time.

4. The Animal Society in Hingham, MA

Your donations are used to feed and shelter hundreds of animals in the Hingham...
PayPage | Payboxes

To: Erin Indianer
From: Renee Indianer
Re: Payment Request

Dear Erin,

Renee Indianer has sent you a payment request. Please click here to review the request.

—110

1. PAGE REQUEST

2. HTML DOC. WITH REFERENCE TO PAY BOX GRAPHIC

3. PAY BOX GRAPHIC REQUEST PLUS COOKIE

4. GENERATE 1-CLICK VERSION OF PAY BOX GRAPHIC 5. 1-CLICK PAY BOX GRAPHIC

6. REQUEST GENERATED FROM SELECTION OF GRAPHIC (PLUS COOKIE)

7. EXECUTE TRANSACTION USING 1-CLICK SETTINGS

8. REDIRECT BROWSER DIRECTLY TO "THANK YOU" URL

Amazon Honor System
Amy, you just paid $0.05 to News-Week

News-Week

| HOME PAGE | COVER STORY | CAMPAIGN 2000 | LIVE TALK | INDEX | Weekend |

UNPAY | YOUR ACCOUNT | RELATED PRODUCTS | ADD TO LIBRARY

Author Sam Shaw says he's not smart enough to be a true yettie.

Are You a Yettie?

Do you have a cell phone? Razor scooter? Messenger bag? Welcome to your generation. A Web exclusive interview with author Sam Sifton

NEWS-WEEK WEB EXCLUSIVE

Nov. 16 — First there were rebellious long-haired....

<Picture>

---

DISCUSSION AREA ▲

People who read this also enjoyed
these other items

Share your thoughts
add a comment
e-mail a friend about this item

Jane Smith
You haven't seen anything until you've seen the yetties in San Jose.
11/29/2000

John Smith
There are even more yetties at Microsoft.
11/29/2000

Barbie Smith
There are lots of yetties at Amazon.com.
11/28/2000

Bubba Smith
I'm tired of these silly classification systems.
11/28/2000

▲ See more comments

Amazon.com Honor System > Creating PayLinks

Creating PayLinks
Easily and seamlessly accept online payments for your digital content on your own site. You determine the amount and can choose from other value-added features such as the Customer Review module.

1. Add a little code around the link to your premium content

For example, if you have the following link to an article you'd like to charge 5 cents for on your web page....

```
<A HREF="http://www.your-
site.com/premium_story.htm">
Headline of Your Article</A>
```

...All you have to do is add the following code (in italics below) and specify the amount you'd like to charge and the unique id we assign to you (so we know where to send the money)...

```
<A HREF=" http://cogniquest.com/test/wwc/grab.cgi?
cp=fuming&amt=.25&url=
http://www.your-site.com/premium_story.htm">
Headline of Your Article</A>
```

2. Add value-added features like Customer Reviews

By just adding another parameter (in italics) to your link, you can add a Customer Review module to your content.

```
<A
HREF=" http://cogniquest.com/test/wwc/grab.cgi?
cp=fuming&amt=.25&reviews=yes&url=
http://www.your-site.com/premium_story.htm">
Headline of Your Article</A>
```

<graphic showing placement of review module on example page>

You can insert the PayLink code yourself or by using our PayLink Creation Tool.

Use the Back button on your browser to return to the Amazon.com Honor System homepage.

FIG. 26 amazon.com

PayLink Creation Tool

Choose the options for your PayLink below. Click Continue when you are finished.

Continue ▶

A. Basic Link Data (required)

Your Nickname: [        ]

Content Location (URL): [                    ]

Content Title: [                    ]

Amount: [        ] ($0.99 Maximum)

B. Special Features (optional)

Customer Reviews: ● No ○ Yes
(What is this?)

Accept Honor Club Subscriptions: ● No ○ Yes
(What is this?)

Continue ▶

FIG. 27 amazon.com

Your PayLink

Your PayLink has been created. Adding it to your site is easy. Just copy the HTML code below and paste it on to your web page.

Directions

- Choose what type of link you would like: text or image.
- Copy everything from the box associated with the link type you choose.
- Paste it into the appropriate place in your HTML. Your tracking ID (fuming) is already embedded in the HTML Option A: Text PayLink Text Link Preview Premium Story[$.05 at Amazon]
Test your link by clicking the title above.

Text Link HTML

```
<A HREF="http://cogniquest.com/test/wwc/grab.cgi?
cp=fuming&amt=.05&url=http://www.contentprovider.c
om/story1.html">Premium Story</A>
```

FIG. 28

COMPUTER SERVICES AND METHODS FOR COLLECTING PAYMENTS FROM AND PROVIDING CONTENT TO WEB USERS

PRIORITY CLAIM

This application claims the benefit of U.S. Provisional Appl. No. 60/244,357, filed Oct. 30, 2000, and U.S. Provisional Appl. No. 60/251,437, filed Dec. 5, 2000, the disclosures of which are hereby incorporated by reference.

FIELD OF THE INVENTION

The present invention relates to computer-implemented services and user interfaces for allowing users to make payments to other users. The invention also relates to methods for integrating user-to-user payment services into external web sites, including but not limited to the web sites of content or service providers.

BACKGROUND OF THE INVENTION

Various web-based services have been developed for allowing users to collect payments from other users. Examples of such services include Qpass and BillPoint. These services generally suffer from a number of deficiencies.

One such deficiency is that the payer typically must complete a significant number of setup steps before making a payment to a new payee. As a result, existing services are not well suited for allowing payees to collect small or one-time payments from large numbers of users. The need to collect such payments may arise, for example, when an author, musical artist, or other content creator wishes to solicit contributions from consumers of downloadable content; or when a charitable organization wishes to solicit online donations from the public.

Another deficiency is that many existing payment services do not provide a simple mechanism for web site operators to integrate the collection process into their own web sites. As a result, prior art payment services are not well suited for small web site operators to solicit and collect payments via their own web sites. Such a need may arise, for example, when an operator of a web site wishes to receive payments from consumers of content hosted by that site. Another deficiency is that existing payment services do not provide an adequate mechanism for payees to enlist other web site operators to assist in the collection process.

Prior art payment services also typically lack the ability for payees to efficiently provide customized or personalized payment requests to payees. The need to provide such requests may arise, for example, when a seller wishes to send a personalized invoice to a buyer, or when an individual wishes to request event-related contributions from a small group of friends.

Many payment services also lack a mechanism for external web sites to provide content to users according to whether, or the extent to which, such users have made voluntary or required payments. In addition, prior payment systems are typically incapable of recognizing return customers.

SUMMARY OF THE INVENTIVE FEATURES

A computer-implemented payment service that embodies various inventive features is disclosed. The payment service may be implemented through a web site of a payment service provider (SP). (As used herein, the term "web" refers generally to a navigation interface in which users navigate between pages or documents using hyperlinks; and "web site" refers generally to a networked server system that supports such a navigational interface.)

One feature involves a payment link generation tool that enables site operators to add payment links or objects to their sites for collecting payments from users. The payment link generation tool may, for example, be accessed by site operators via a payment service provider (SP) site, and may generate and output link coding for adding payment links to external sites (i.e., sites that are separate and distinct from the SP site). Users that register with the payment service can use such payment links to make payments to site operators via the payment service.

Another feature involves the provision of single-action payment links within external web pages to allow users to access, and make payments for, items of content. For example, a content provider site may include a payment link for allowing users to access and pay for a particular article. When a recognized 1-Click user selects this link, the SP site charges the account of the visitor (typically a small payment in the range of 5 to 50 cents), and redirects the visitor's browser to the content provider page containing the content. This content page may include one or more display objects served by the service provider site, such as a bar displaying a payment confirmation message. Multiple payments made by the same user may be aggregated for purposes of charging the user's credit card. The content page may also include links to other services provided by the service provider site, such as an "unpay" button or a button for adding the content item to a personal library.

The various features of the invention may be implemented within conventional web sites that are based on HTML (Hypertext Markup Language), and may also be implemented within web sites that use HDML (Handheld Device Markup Language), XML (Extensible Markup Language), and other coding conventions.

BRIEF DESCRIPTION OF THE DRAWINGS

A computer-implemented payment service that embodies the above and other inventive features will now be described with reference to the following drawings:

FIGS. 5-12 illustrate example web pages showing how users manage pay pages and pay boxes through the service provider site.

FIGS. 13-16 illustrate example web pages showing how users can locate and install pay boxes of other users to become pay page associates.

FIGS. 23-25 are hypothetical screen displays showing how web pages of external web sites may be augmented with (a) links to services provided by the service provider site, and (b) personalized content served by the service provider site.

FIG. 26 illustrates an instruction page for adding payment links and customer review modules to pages of external web sites.

FIGS. 27 and 28 illustrate a payment link generation tool of the service provider site.

DETAILED DESCRIPTION OF THE PREFERRED EMBODIMENT

Figure 1:
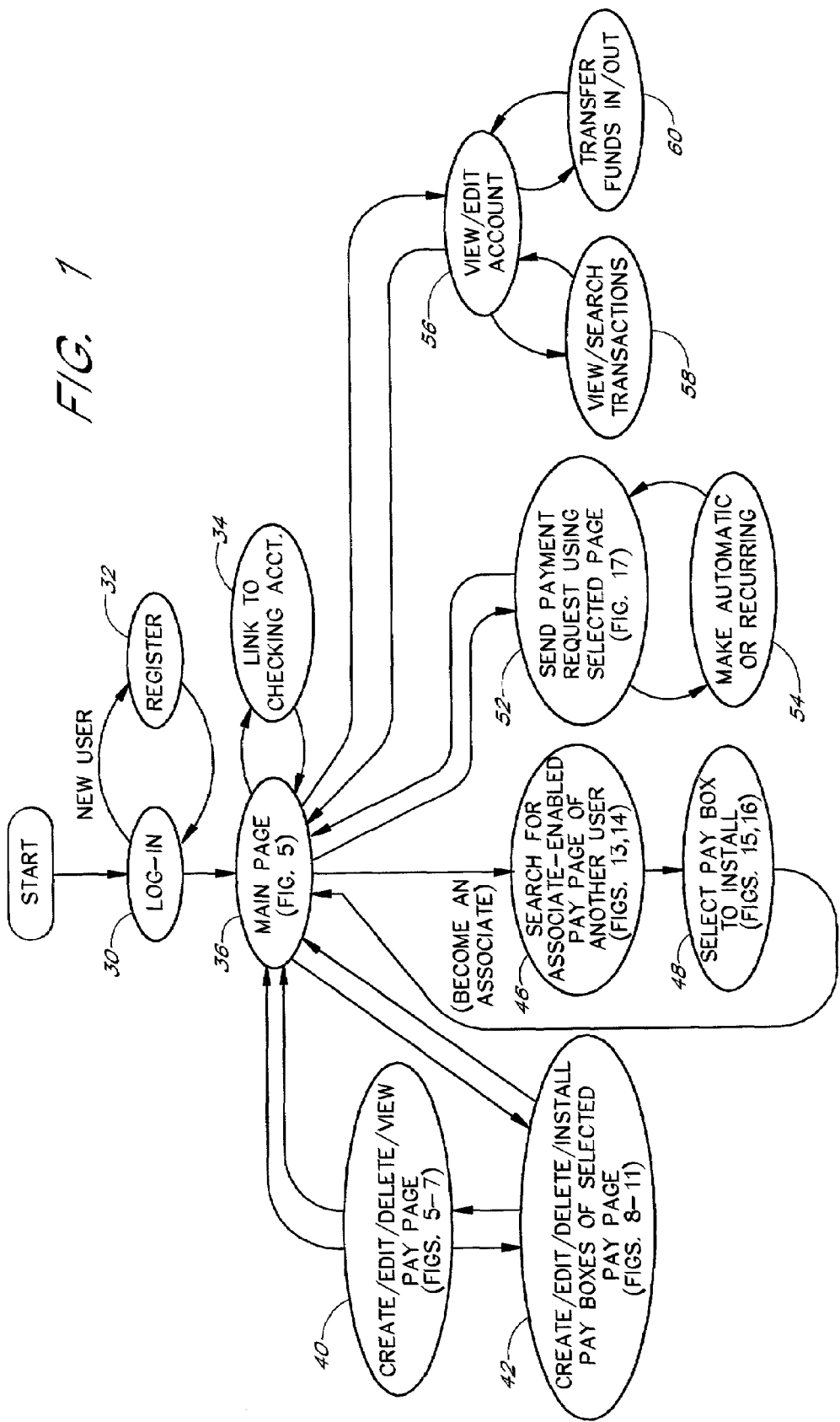
FIG. 1 illustrates an overall process flow through which users register with the payment service, manage pay pages, and perform various related actions using a service provider web site.

A computer-implemented payment service that embodies the various inventive features will now be described with reference to the drawings. The service is hosted by a service provider site (also referred to generally as "the system"), which comprises an HTML-based World Wide Web site in the illustrated embodiment. As will be recognized, the service and its various features may also be implemented within other types of web sites and server systems, including but not limited to systems that provide wireless browsing capabilities. The various service functions described herein are preferably implemented within software executed by one or more general-purpose computers, but could be implemented using other types of computing devices.

As will be apparent, the various inventive features of the service may be implemented differently than described herein. Further, the service may be implemented with only a subset of the disclosed features, and/or with additional features that are not disclosed. The following description is thus intended to illustrate, and not limit, the invention. The scope of the invention is defined by the appended claims.

The description of the payment service is arranged within the following sections and subsections:

I. Terminology
II. Overview
   A. General Process Flow
   B. System Components
   C. Pay Page Transaction Processing
III. Example Pages and Page Flows
   A. Management of Pay Pages and Pay Boxes
   B. Associate Hosting of Pay Boxes
   C. Sending a Payment Request
IV. Pay Page Templates and Parameters
V. Pay Boxes and SP-Generated Display Objects
VI. Pay Box Tracking and Feedback Reports
VII. Controlled Access to Content Based on Payment History or Other User Attribute
VIII. Payment-Based Access to Content
IX. Display of Payment Counter Data within Pay Pages
X. 1-Click Payments from External Sites
XI. Content Distribution Models
XII. Integration of Payment Service with External Content Provider Site
XIII. Payer Preferences for Treatment on External Sites I. Terminology The following terms will be used throughout the description of the payment service:

Pay page—A custom page or screen through which an associated user (the "payee" or pay page "owner") can receive payments from other users. Typically, a pay page includes information about its owner. Pay pages are persistent, meaning that a given pay page may be used to receive many separate payments over time (from the same or different users). In one embodiment, payees can create pay pages for a variety of different types of payment scenarios (using corresponding pay page templates), such as general-purpose payments, honor system payments, charitable donations, and invoice payments.

Service provider or "SP"—Generally, the business entity (or combination of related entities) that operates the payment service.

Service provider site (or SP site)—A networked computer system, such as a web-based server system, that implements the payment service. This system may be accessible through a single or multiple Internet domain names, and may include computers that are geographically remote from one another. In the sample screen displays, the SP site includes the amazon.com web site. In one embodiment, the SP site also hosts or is linked to other types of e-commerce services, such as retail sales, music download, and online auction services. Sites or pages that are separate and distinct from the SP site are referred to as being "external." In the illustrated embodiments, it may be assumed that all external sites are hosted by computers that are outside the control of the SP, and that such sites are controlled by business entitles other than the SP.

Pay box—A display object that may be incorporated into a page to provide functionality for viewers of that page to initiate payments to a pre-specified recipient. In the preferred embodiment, each pay box includes a graphical image served by the SP site and provides a link to a corresponding pay page. In one implementation, pay boxes that point to a particular pay page may be installed within a web site of the pay page owner ("second party sites") and/or web sites of third parties ("third party sites" or "associate sites"). Pay boxes may optionally specify pay page parameters, such as a suggested payment amount.

Pay box graphic (or "pay box image")—The graphical image portion of a pay box (e.g., a GIF or JPEG file). When a user views a page having a pay box installed therein, the user's browser requests the pay page graphic from the service provider (SP) site. In one embodiment, if the user is recognized by the SP site this graphic is customized for the particular user (e.g., by incorporating the user's name into the graphic). The graphic may, but need not, be similar in size and appearance to conventional banner ad graphics. A textual link, button, icon, or another type of content (Flash, Shockwave, etc.), may alternatively be used.

Associate—A web site owner or operator that hosts (displays) a pay box or other link to a pay page of another user, potentially in exchange for commissions or other compensation for resulting referrals. For example, a music download site may host pay boxes of the associated artists to allow users to make voluntary or mandatory payments to the artists; the operator of the music download site (associate) may receive commissions on such payments. The use of third party web sites to display pay boxes is also referred to as "pay box syndication."

Honor system payments—Payments in which the visitor is asked to pay a particular amount in return for accessing content. For example, users may be asked, via a pay box hosted on a music download site, to pay $1 for each MP3 file downloaded. The content may also be in the form of a computer-implemented service (e.g., locating the best price for an item). Voluntary payments for accessing content may also be referred to generally as "tips."

1-Click—A service which allows a customer to complete a transaction with a single action, such as a single mouse click, using pre-specified information. One implementation of such a service is described in U.S. Pat. No. 5,960,411, the disclosure of which is hereby incorporated by reference.

I. Overview

The payment service preferably provides functionality for users to receive payments from other users via payee-customized pay pages. In one embodiment, once a user has set up an account with the SP, a default pay page is automatically created for that user. In another embodiment, pay pages exist only for those users who have actively created a pay page. In either case, each user can preferably have more than one pay page. For example, a musical group may create a separate pay page for each work it has posted in digital form (see FIG. 7), and may use these pay pages to collect voluntary payments (tips or honor system payments) from users that download such works. Further, an individual may create one pay page for personal use and another for business use.

In a preferred embodiment, each pay page is based on a template that specifies the layout and the behavior of the pay page. Each template contains default values that can be overridden by the pay page owner during the pay page setup process. Each pay page preferably includes the following "required" information fields or values: (1) a title, (2) an identifier of the pay page "owner" or "payee," (3) a description, and (4) an amount, which can typically be modified by the payer. Additional fields and options may be defined by a particular template. Different templates may be provided for different types of organizations, such as charitable organizations, authors, musical artists, other content providers, and individuals. Further, templates may be provided for specific types of pay page uses, such as tipping, honor system payments, invoicing, auctions, membership dues, rebate requests, and payments required for access to content. The types of elements that may be included within a template in one embodiment are described below in section IV ("Pay Page Templates and Parameters").

Each pay page preferably has a unique URL (Uniform Resource Locator). The URLs of the default pages (if used) are preferably based on a naming convention in which the user's email address is the only variable (e.g., www.paypages.com/<email address>.htm). This allows users to easily locate the default pay pages of other users. An SP-assigned or user-selected nickname may be used in place of the email address. Other types of pay pages may be given encoded URLs that are relatively difficult to identify through trial and error. As discussed below, the service may support a variety of methods for locating and accessing pay pages, including pay boxes and a search engine.

In addition to the payee-specific pay pages, the service may provide a generic "send money" page for sending money to payer-specified recipients.

Although the web sites and pages in the illustrated embodiments use HTML (Hypertext Markup Language) coding, it will be apparent to those skilled in the art that other markup languages could be used. For example, the inventive features could be implemented using web sites and web pages that use HDML (Handheld Device Markup Language), XML (Extensible Markup Language), or another appropriate markup language. In addition, although the use of personal pay pages provides important benefits, it will be recognized that many of the features of the invention can be implemented without requiring payees to have pay pages.

A. General Process Flow (FIG. 1)

Figure 3:
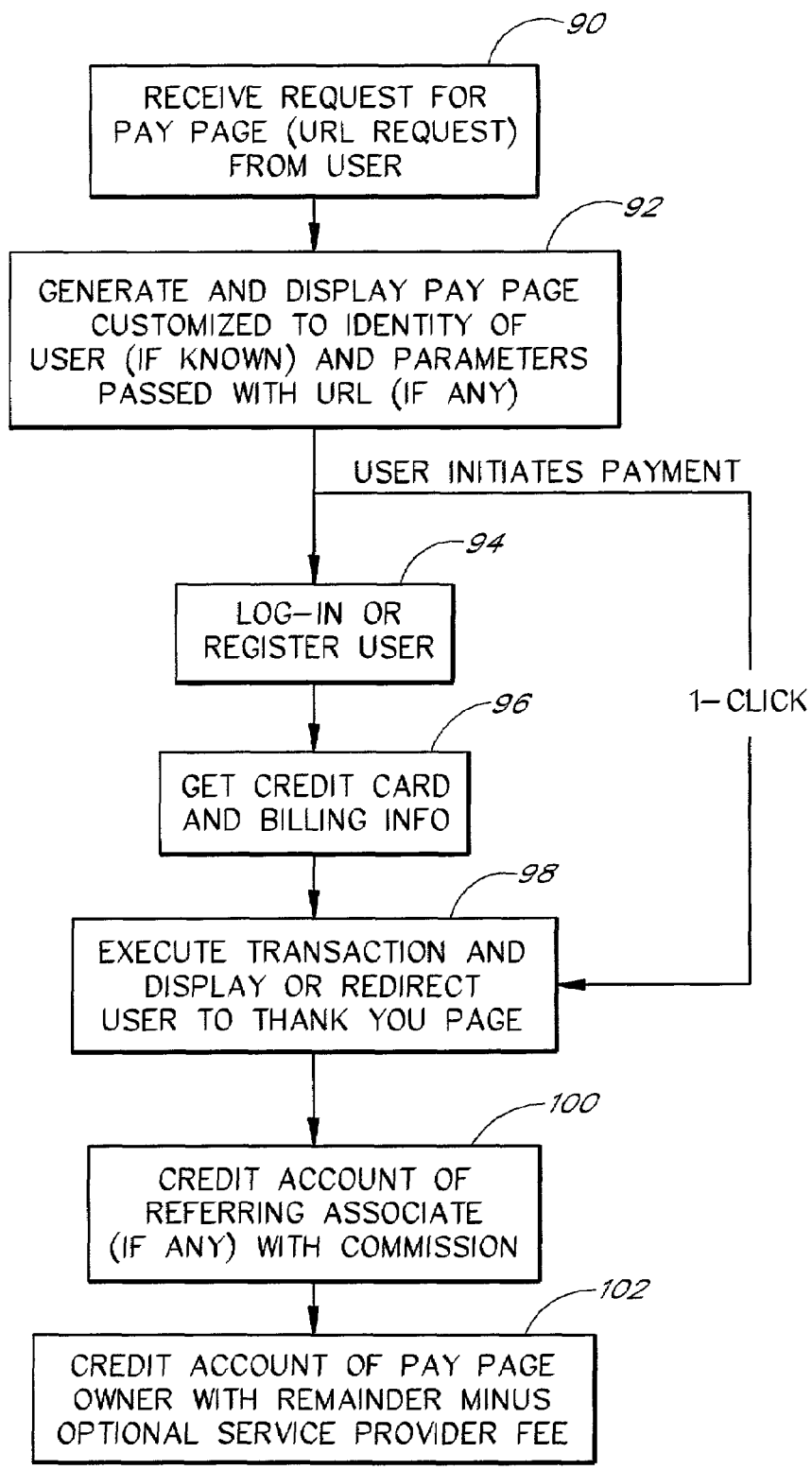
FIG. 3 illustrates the process through which the service provider site displays pay pages and processes pay page transactions.

FIG. 1 illustrates the basic process flow through which users register with the service, manage pay pages, and perform various related actions. Each state within FIG. 1 corresponds generally to one or more pages of the SP web site. As indicated by the figure numbers listed in FIG. 1, examples of some of these web pages are included in subsequent drawings. The process by which users make payments via pay pages is shown in a separate drawing (FIG. 3).

As depicted by the "log-in" state 30, users initially enter the payment service by logging-in with a pre-selected username and password (or other authentication information). New users must initially register with the service (state 32) before they can make or receive payments via pay pages. During the registration process, the user enters various account information such as a name, credit card number, password, and email address. During or following the registration process, the user can also preferably enter settings for, and enable, the system's 1-Click™ service. As discussed below, when the 1-Click service is enabled, the user can make pay page payments with a single mouse click or other single selection action. In one embodiment, users can also make 1-Click payments directly from pay boxes hosted on external web sites. During or following the registration process, the SP site stores a cookie on the user's computer to permit subsequent identification of the user.

As illustrated by state 34, the user may also optionally link the account with the SP to an existing checking account. The bank routing number associated with the checking account may be determined automatically, based on information entered by the user from the face of a check, using the process described in U.S. application Ser. No. 09/517,563, filed Mar. 2, 2000, the disclosure of which is hereby incorporated by reference. Once the pay page account has been linked to a checking account, the user may initiate transfers of funds between the two accounts (state 60).

As depicted by state 36, the service may include a main page (see FIG. 5) or other area from which users can initiate various actions. The main page preferably displays a listing of the user's pay pages (if any), and allows the user to select a particular pay page with which to perform an action. As illustrated by state 40, the user can create a new pay page, and can an edit, view, or delete an existing pay page (see example page flow in FIGS. 5-7, discussed in section III-A below).

As depicted by state 42, the user may also create, edit and delete pay boxes for a particular pay page (see example page flow in FIGS. 8-11, discussed in section III-A below). Once a pay box has been created, the pay page owner (and in some embodiments, other users) can "install" that pay box within one or more external web pages to provide a link to the corresponding pay page. To facilitate this process, the service automatically generates a sequence of HTML (Hypertext Markup Language) coding to be added to the host web page (see FIGS. 10 and 16, discussed below). This HTML coding includes a reference to the pay box image (hosted by the SP site), such that the image is automatically requested from the SP site when the page is displayed by a browser. The coding may alternatively be generated according to another markup language or link coding convention. For example, in a wireless environment, the appropriate HDML (Handheld Device Markup Language) coding may be generated. Further, the payment service may generate coding for installing other types of links (e.g., textual) to pay pages.

One particular application for the pay box feature is to provide a mechanism for compensating creators of digital content. For example, a content creator such as a musical group, author, or web site operator could install a pay box on its own (second party) web site to solicit voluntary or mandatory payments from users. Users who access the content can then click through the pay box to make voluntary or required payments to the content creator. The amount of this payment (e.g., $1 per download) may be suggested by the pay box, in which case this amount is preferably displayed within the pay page when the user clicks through (as described below). Where the payments are "required," an appropriate mechanism may be used to prevent access to the content until the user has paid (see, for example, section VIII titled "Payment-Based Access to Content").

One variation of this model is for the SP itself to provide a forum for content creators to post their works in a downloadable form. The posted works could then be displayed (e.g., on product detail pages) in conjunction with pay boxes for soliciting voluntary (or mandatory) payments. With this model, any user (regardless of whether it operates a web site) could post a work on the SP site and use the payment service to collect payments from users. For example, a relatively unknown musical group could post a song or album in MP3 format together with a pay box requesting a voluntary payment of $1 per download.

In one embodiment of the payment service, during the pay page creation or editing process (state 40) the user may "associate-enable" a particular pay page. Once a pay page has been associate-enabled, other users may install one or more of that pay page's pay boxes within their own web pages—optionally in exchange for commissions or other compensation for resulting referrals. For example, a charitable organization such as the Red Cross may associate-enable its pay page and create one or more pay boxes for that page. Other users (associates) may then install these pay boxes on their own web sites to provide a mechanism for others to locate the Red Cross pay page. When a user (a) follows (clicks through) such a pay box and then makes a payment on the corresponding pay page, or (b) where applicable, makes a 1-Click payment from the pay box, the associate who generated the referral may be given a portion of that payment.

To become a pay page associate, the user initially searches for or otherwise navigates to a desired associate-enabled pay page (state 46). A search engine may be provided for this purpose. The user then selects a corresponding pay box (or optionally another type of link to a pay page), and installs the pay box on one or more third party sites (state 48). This process is illustrated by the example page flow of FIGS. 13-16, discussed in section III-B below.

One particular application for the associate feature is to provide a mechanism for compensating distributors of digital content. A third party (associate) distributor of digital content (e.g., a music or e-book download site) could display the pay boxes of artists, authors or other content creators together with the associated content. When users click through such pay boxes and make voluntary payments to the content creators, the third party associate may be given a portion of each payment as compensation for distributing the content. Another specific application is to allow web site operators to raise money for their favorite charities while receiving commissions.

As illustrated by state 52, the system may also permit users to generate and send payment requests to other users. To initiate a payment request, the payee-user specifies the email address(es) of one or more recipients, and enters pay page customization data specifying how the payee's pay page should be displayed to such recipients. This customization data may include, for example, a requested payment amount and an associated textual description. The system responds to initiation of the payment request by sending an email to each recipient with a URL-encoded link to the pay page. The URL portion of this link includes parameters that are used by the SP web site to determine how to display the page. This feature of the system may be used, for example, to send customized invoices to other users. Other example applications for this feature are described below in section III-C ("Sending a Payment Request").

As depicted by state 54, the service may also provide an option to set up an automated payment request or a recurring payment request. An automated payment request may be used, for example, by an online auction seller to automatically send invoices (links to customized pay pages) to winning bidders. Such a pay page may automatically be populated with the picture and description of the auction item (as displayed within the corresponding auction page) and the dollar amount of the winning bid. A recurring payment request may be used to collect any type of recurring payment, such as subscription fees or group membership fees.

Finally, as depicted generally by states 56-60, the service may provide various account management pages. From these pages, the user may perform such actions as viewing pay page transactions (both payee and payer), transferring funds into and out of the account, and updating a user profile. The service may also generate, send and retain transaction receipts, and may provide reporting for tax purposes (e.g., for payments to charitable organizations).

B. System Components (FIG. 2)

Figure 2:
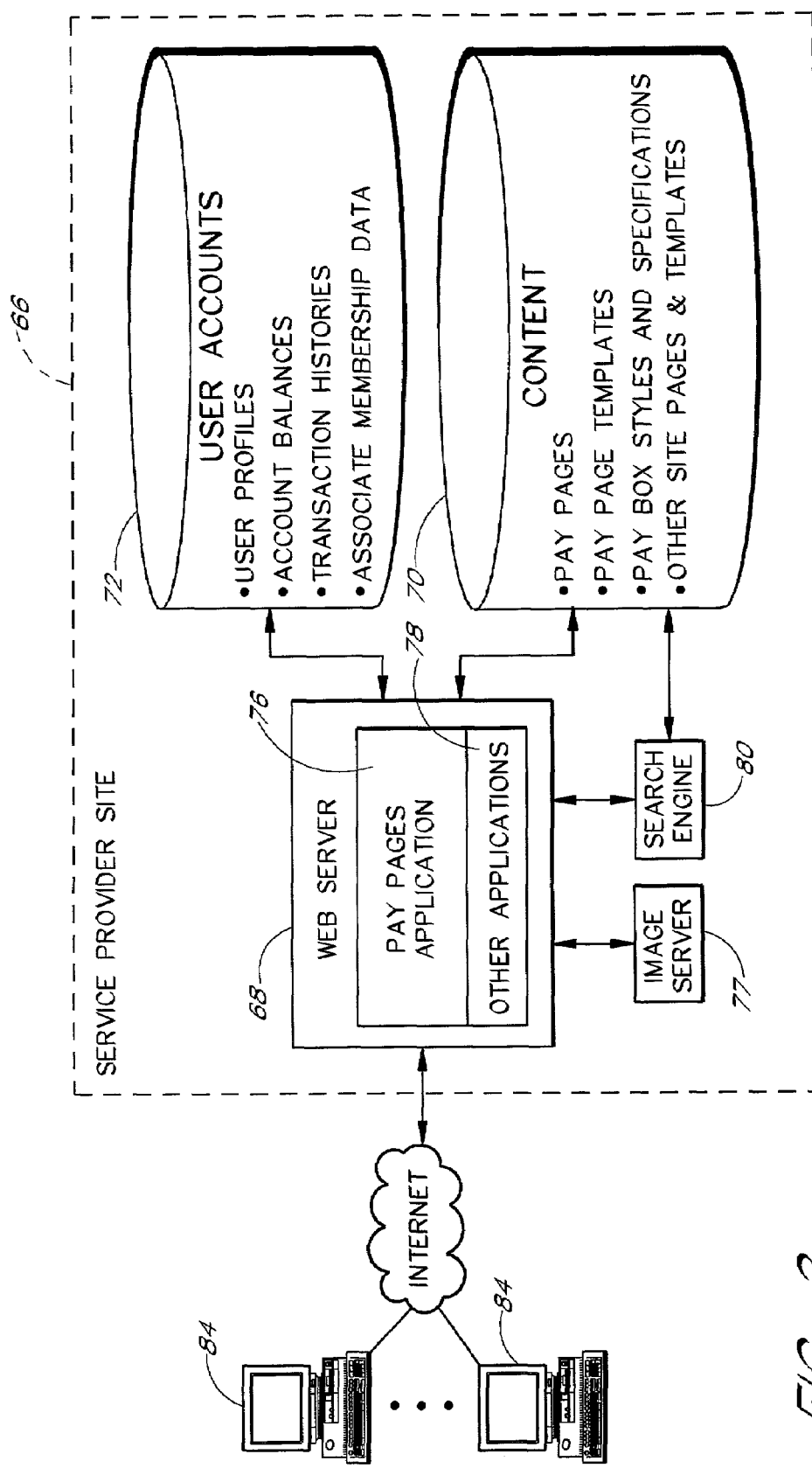
FIG. 2 illustrates the basic web site components used to implement the payment service.

FIG. 2 illustrates a set of components that may be used to implement the payment service on the SP site 66. The system includes a web server 68 which accesses a content database 70 and a user accounts database 72. The system may also include databases for storing other types of information, such as a products database and an auction database (not shown).

The web server 68 includes a pay pages application 76 which embodies the various pay page related functions described herein. The pay pages application includes or makes use of modules for performing some or all of the following tasks or services: (a) identification of return visitors to the SP site using cookies, (b) generation of customized pay pages and pay boxes according to settings specified by payees, (c) display of the pay pages to visitors, customized according to any parameters passed with page request and customized with visitor names/1-Click settings, (d) processing of payment transactions, including tracking and crediting associates for referrals and sending "thank you" emails to payers, (e) generation of HTML or other coding for installing pay boxes, or other links to pay pages, within external pages, (f) user browsing of associate-enabled pay pages and their associated pay boxes, (g) generation of payment requests, and (h) user viewing and updating of pay page account information. Each module preferably includes executable code, and where applicable, includes web pages for interacting with users. Other functions and services that may be implemented by the pay pages application are described below.

As illustrated, web server 68communicates with an image server 77 that dynamically generates and serves pay box graphics (and possibly other types of images) for display within external web pages. Another type of object server, such as a server of animation objects or other executable display objects, could alternatively be used. In one embodiment, the pay pages application 76 and the image server 77 recognize different browser capabilities (HDML, wireless, WAP, etc.) and device types, and select the pay pages and pay boxes to display accordingly.

The web server may also include applications 78 for implementing other types of services such as a retail sales service and one or more person-to-person sales services. The various applications 76, 78 may share code modules for implementing common tasks such as registration, user authentication, and credit card processing.

The web server also preferably communicates with a search engine 80 for searching the various areas of the site. Using this search engine, users can search for pay pages of other users based on user name and other criteria. As mentioned above and illustrated in FIG. 12, users can run searches specifically for pay pages that are associate-enabled.

As depicted in FIG. 2, the content database 70 includes the pay pages created by users, and includes pay page templates that may be used to generate page pages. As mentioned above, different templates may be provided for different payment-related scenarios. The templates are preferably created by the service provider, although the service could provide functionality for payees to create their own templates. The content database also includes web pages and templates for the various other areas of the site.

The content database 70 may also include the descriptions of pay box styles made available by the SP, and specifications of pay boxes that have been defined by pay page owners. The specification of a pay box may indicate, for example, the pay box style, color, suggested payment amount, textual message, and greeting format (see FIGS. 8 and 9). Some or all of these pay box parameters may alternatively be encoded within pay box identifiers passed by URL. As described below, the image server 77 uses the pay box specifications to dynamically generate and serve pay box graphics (e.g., GIF images) to user computers 84. The pay box graphic may also be customized to include the name and other information about the visitor, if known.

In embodiments in which the SP site allows users to post and receive voluntary payments for digital works (as described above), the content database may also include copies of such works (not shown). These works may be located using the site's search engine or any other suitable navigation interface.

As further illustrated in FIG. 2, the user accounts database 72 stores account-specific information about users of the site. For each user, this information preferably includes a user profile (name, credit card number, 1-Click settings, etc.), an account balance, a history of transactions (including incoming and outgoing pay page payments), and information about any pay page associate relationships the user has created.

Figure 4:
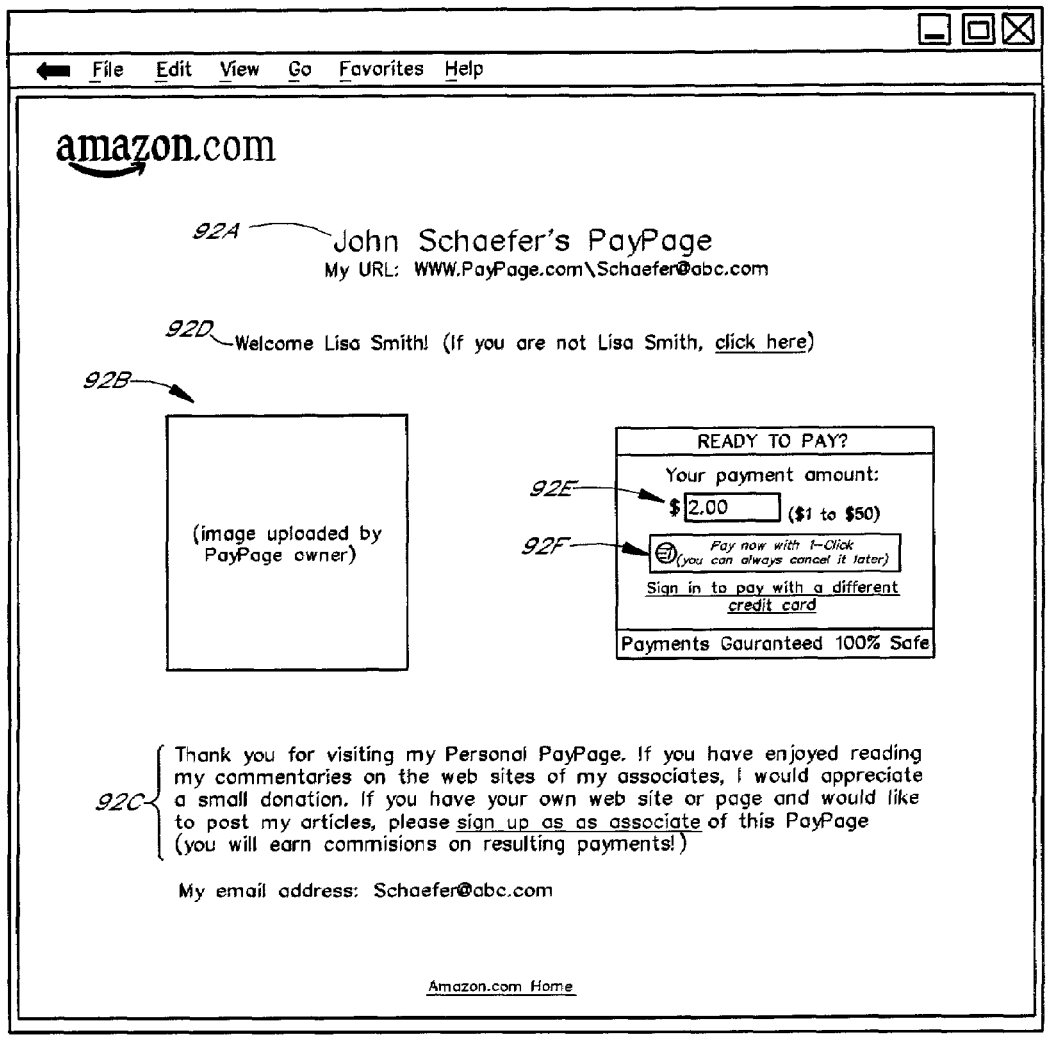
FIG. 4 illustrates an example pay page.

C. Pay Page Transaction Processing (FIGS. 3 and 4)

FIG. 3 illustrates the basic process by which the SP web site 66 displays pay pages, and processes pay page transactions, via the pay pages application 76. As depicted by block 90, the web site initially receives a URL request from a user/computer 84 for a particular pay page. If the URL request resulted from user selection of pay box, the URL may include one or more parameters that override the default values of the pay page. For example, if the pay box specifies a suggested payment amount, this amount is passed via the URL and overrides the default amount displayed within the pay page. Additional details of how parameters may be used are described below in section IV ("Pay Page Templates and Parameters.") If the URL request resulted from selection of a pay box hosted by an associate, the URL also preferably includes a unique identifier of the associate.

If the URL request is from an existing user of the service, the request typically includes a cookie that is used by the system to identify the user. The use of cookies for this purpose is well known in the art.

As depicted by block 92 of FIG. 3, the web site responds to the URL request by generating and returning (displaying) the pay page. An example pay page as seen by the user is shown in FIG. 4. As illustrated, the pay page preferably includes a default or owner-assigned title 92A, a graphic image (logo or photo) 92B uploaded by the pay page owner 92B, and a memo or description 92C entered by the pay page owner. In addition, the pay page includes a greeting message 92D that identifies the visitor by name (if known). If the visitor's identity is unknown, a default message may be used such as "Please sign in."

As further illustrated by FIG. 4, the pay page also includes an "amount" field 92E in which the visitor can enter a payment amount, and a payment button 92F or other link for allowing the visitor to initiate the payment process. In the illustrated example, a suggested payment amount of $2 appears in the amount field 92E. If the visitor is known and has the 1-Click service enabled (as in the FIG. 4 example), the payment button 92F is preferably configured and labeled as a 1-Click button that can be selected to complete the payment transaction. If, on the other hand, the visitor either (a) is unknown, or (b) is known and does not have the 1-Click service enabled, the payment button 92F includes a message such as "Pay Now! (select your credit card)."

As depicted by the "1-Click" path in FIG. 3, if the visitor selects a 1-Click version of the payment link 92C, the system 66 executes the transaction (preferably within a predefined period of time) without requiring any further user action. In addition, the system displays a thank you page (block 98) or redirects the user to an owner-specified page (typically a "thank you" page of the owner's external web site). No additional user action is needed to complete the payment transaction at this point. If, on the other hand, the visitor initiates payment via a non-1-Click link, the visitor may be required to log-in or register and select a credit card before the transaction is executed (blocks 94 and 96).

Although credit cards are used in the illustrated embodiment, any appropriate method for transferring funds between users can be used. In addition, it should be understood throughout the various embodiments described herein that the payer's credit card need not actually be charged at the time of the transaction. For example, in embodiments in which users typically make frequent small payments (e.g., less than $1) for accessing articles or other content, the SP site may aggregate a number of payments for purposes of charging the user's credit card.

As depicted by block 100, if the visitor was referred to the pay page from a pay box displayed within an associate web site, the system may credit the account of the associate-user with a commission. The system could additionally or alternatively be configured to credit the associate's account with a bounty payment (e.g., for each referred user who sets up an account with the SP). Examples of methods that may be used to track referrals from associate web sites and determine associate commissions are described in U.S. Pat. No. 6,029,141, the disclosure of which is hereby incorporated by reference. As depicted by block 102, the SP may extract a transaction fee before crediting the remainder of the payment amount to the payee's account.

As described below in section X ("1-Click Payments from External Sites"), the above-described process may be varied to allow 1-Click visitors to complete the transaction directly from an externally-hosted pay box, such as by simply clicking on the pay box. In such instances, the SP site responds to selection of the pay box by immediately redirecting the visitor's browser to an external URL pre-specified by the pay page owner (or in some embodiments, the associate). Thus, the transaction is completed without requiring the visitor to view the pay page.

The process shown in FIG. 3 may also include appropriate error handling tasks (not show) for processing invalid pay page parameters, invalid pay page entries (e.g., payment amount less than minimum payment amount), and other error conditions.

III. Example Pages and Page Flows

Figure 5:
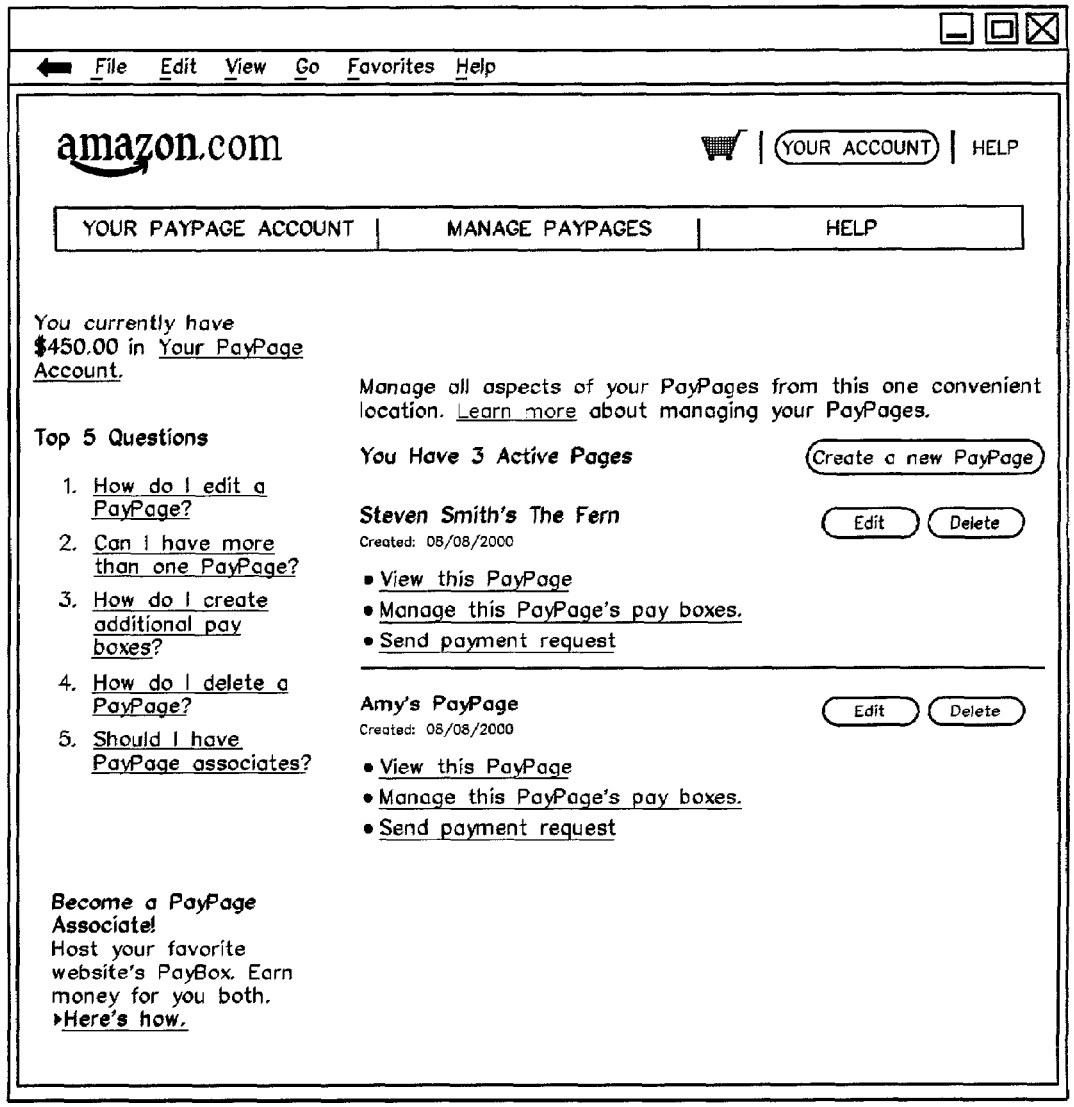

FIG. 5 illustrates an example "main page" of the payment service. This page displays the user's pay page account balance, and lists the pay pages that are currently active within the account. The page also provides links for the user to perform the following types of actions with respect to a selected pay page: edit page, delete page, view page, manage page's pay boxes, and send payment request. The option to send payment requests may be omitted, or may be provided only for certain types of pay pages (e.g., the user's default pay page). The main page also provides links for the user to create a new pay page, become a pay page associate, and access other areas of the site.

A. Management of Pay Pages and Pay Boxes (FIGS. 6-12)

The basic process for creating and managing pay pages and associated pay boxes will now be described with reference to FIGS. 6-11. In this example flow, it is assumed that all pay pages are created using the same template. Where different templates exist for different types of pay pages, a user wishing to create a new pay page may initially be prompted to select the pay page type.

FIG. 6 illustrates the "step one" page of the pay page management process. This page may be accessed by selecting the "Create a New PayPage" button, or one of the "edit" buttons, on the main page (FIG. 5). This "step one" page summarizes the six categories of pay page settings that can be customized, and provides respective "edit" buttons for allowing the user to modify the default settings.

The first category of settings is the messaging associated with the pay page. The messaging includes a pay page description to appear on the pay page, a thank-you message to be displayed to a payer following payment, and a thank you message to be sent by email to the payer. The pay page owner may also be given the option to upload an audio or video clip to be played within the pay page.

The second category is the title and color scheme of the pay page. The color scheme may, for example, be selected to be similar to that of the owner's referring site.

The third category is an optional image to be displayed within the pay page. This may be used, for example, to display a picture of the pay page owner, or to display an image associated with the downloadable content to which the pay page corresponds.

The fourth category is the payment settings of the pay page. These settings include a default payment amount (the amount transferred if the payer does not modify the amount field) and a minimum payment amount.

The fifth category is the advanced settings for the pay page. By editing the advanced settings, the user can specify whether the page is to be associate-enabled, and if so, the commission percentage to be paid for referrals. In addition, the user can specify a location and an email address to be displayed within the pay page, and can specify the URL of a thank you page to be displayed upon completion of the payment process.

The sixth category involves the use of an optional payment counter. This feature can be used to display an optional chart on the pay page. When this feature is enabled, the pay page includes a real time counter indicating an amount received, and/or a number of payments received, via the pay page or an owner-specified set of co-owned pay pages. The counter may optionally be displayed as a goal chart indicating the payment total relative to an owner-specified goal. The payment counter feature may be used, for example, by charities to display real time fundraising data. An example implementation of this feature is described below in section IX titled "Display of Payment Counter Data within Pay Pages."

Figure 7:
Figure 8:

When the user finishes customizing the pay page settings, the user can select a "continue" button to access the "step two" page (FIG. 7). In step two, the user previews the pay page, and can either go back to make additional changes or proceed to step 3.

In step three (FIG. 8), the user can select a pay box style to use with the pay page. The user can alternatively return to the main page (FIG. 5) by selecting the "Manage PayPages" link. In the illustrated example, each style corresponds to a particular pay box size. Although rectangular pay boxes are used in this example, pay boxes having other configurations may be used.

In step four (FIG. 9), the user can create a pay box having the previously selected style. Specifically, the user can specify a greeting and message to be displayed in the pay box, and can choose a pay box border color. In addition, the user can specify a suggested payment amount (e.g. $1) for use with the pay box.

Figure 9:
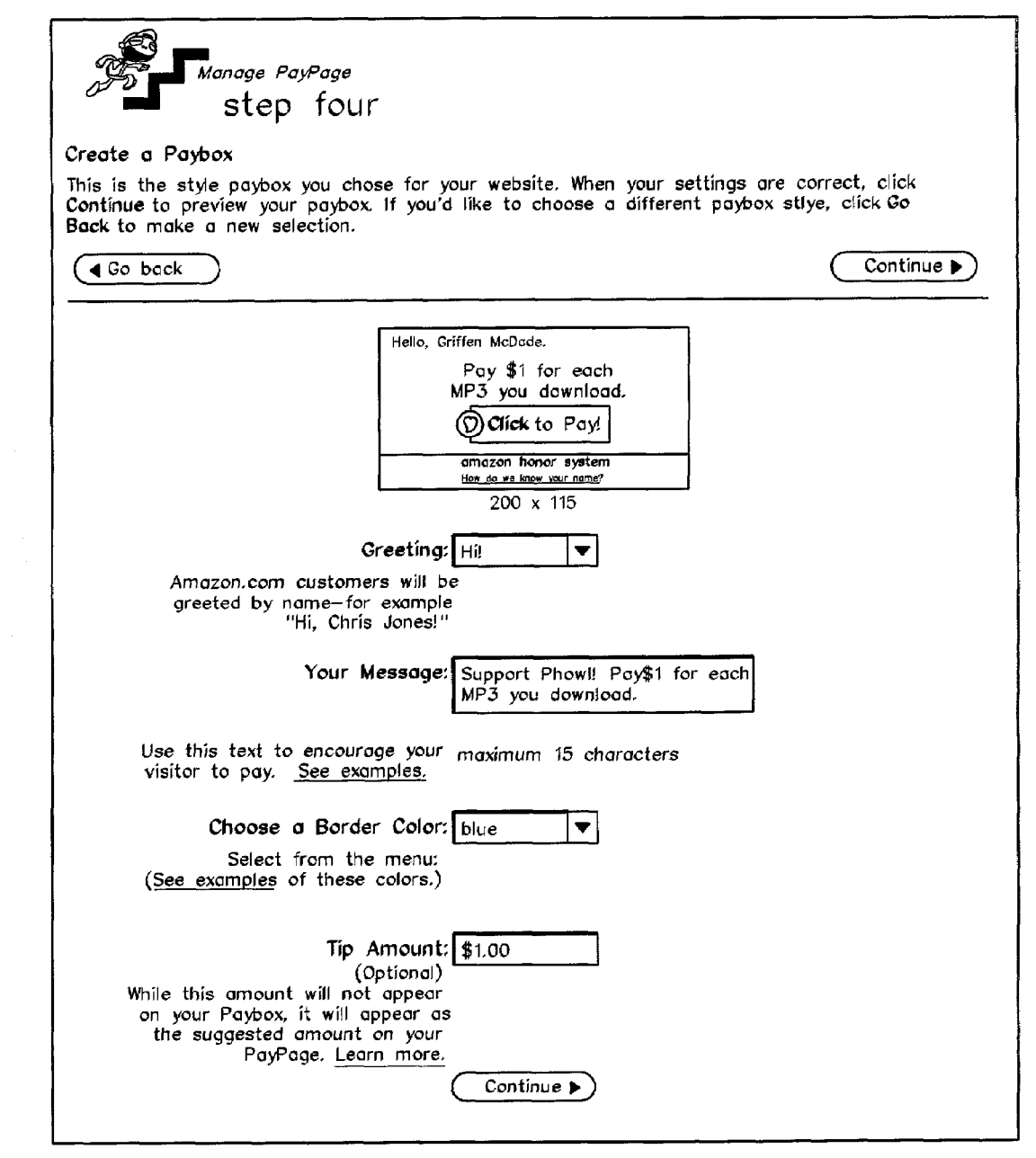

Preferably, when a suggested amount is specified, this amount is passed by URL as a parameter, and is displayed on the pay page when a user accesses the pay page through this pay box. Different pay boxes for the same pay page may have different suggested payment amounts (or other pay page parameters). Although only one type of pay page parameter (payment amount) is shown in FIG. 9, the pay box creator may be prompted to specify other types of parameters, such as pay page display color, other textual fields, etc. In this manner, the pay page can be customized (displayed) differently for different pay boxes. The use of parameters to specify pay page display attributes is described in section IV ("Pay Page Templates and Parameters"). When the user selects the "continue" button to proceed to step five, the pay box settings are stored in the content database 70 for subsequent use.

In step five (FIG. 10), the pay box is displayed to the user together with the HTML code for installing the pay box on a web site. The pay page owner can install the pay box within any number of web pages by copying the block of HTML code into the HTML coding of such web pages. Advanced users can also manually append additional parameters to the pay page URL to control other display attributes of the pay page.

As illustrated in FIG. 10, the HTML code includes a reference to the pay box graphic served by the SP site. Thus, when a user/browser retrieves the HTML document in which the pay box is installed, the browser automatically requests the pay box graphic from the SP site. If the request includes a cookie that allows the SP site to identify the user, the SP site preferably incorporates the identified user's name into the pay box graphic as shown. Selection of the "continue" button of the "step five" page returns the user to the main page (FIG. 5).

Figure 11:
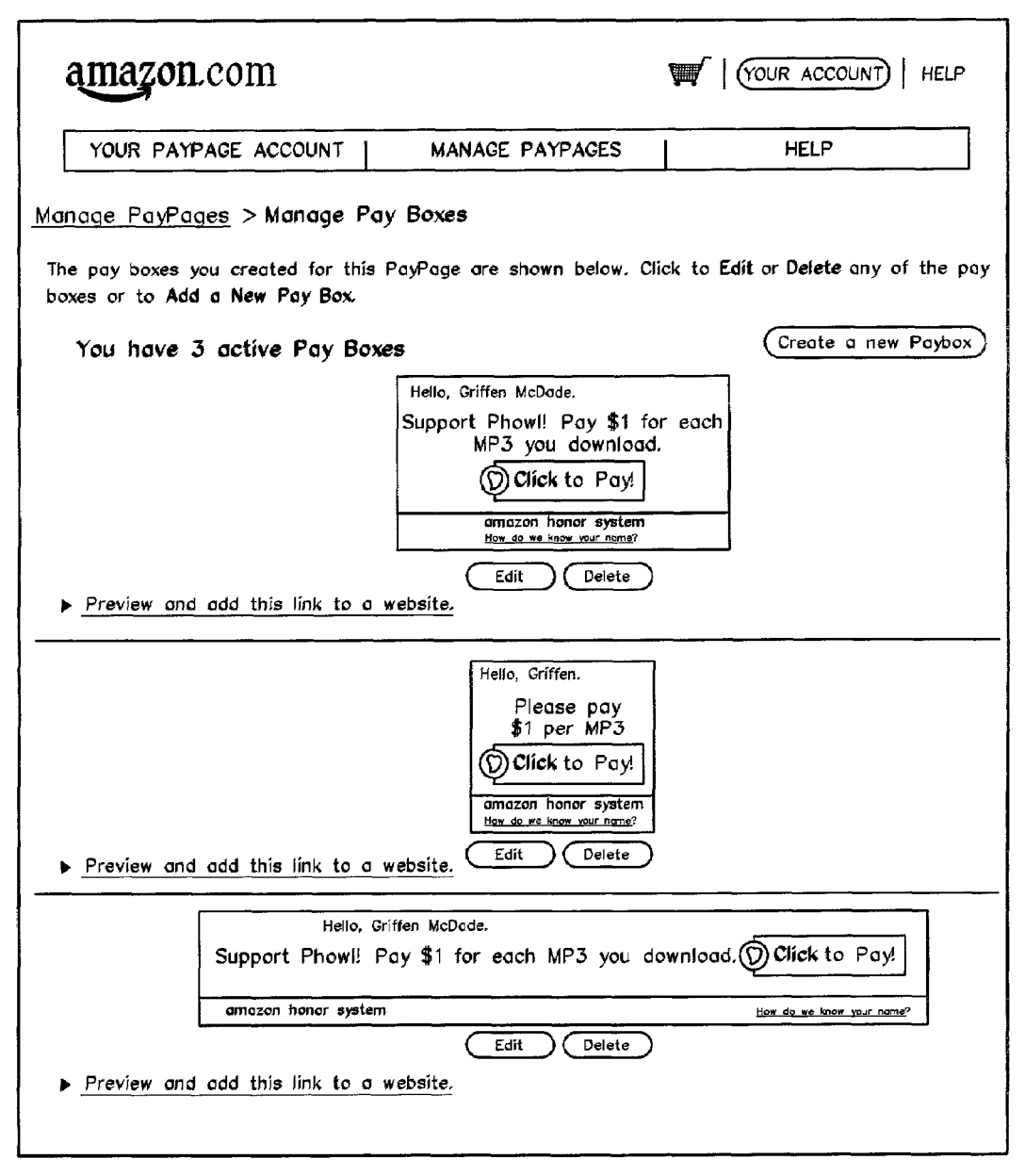

As illustrated in FIG. 5, the user can also view and manage the pay boxes associated with a particular pay page by selecting the corresponding link titled "Manage this PayPage's pay boxes." FIG. 11 illustrates an example of the "manage pay boxes" page that appears when this link is selected.

Although the pay boxes shown in the FIGS. 8-11 vary in size and contain textual content, "standard" pay boxes without any textual content may alternatively be used. For example, as described below, standard buttons or icons may be used in which the payment amount is represented by a particular color (e.g., green, blue and red payment buttons represent payments of 5 cents, 10 cents, and 25 cents, respectively). This may be useful, for example, where the pay boxes are used to make small, frequent, 1-Click or other payments from external content provider sites (see section X, "1-Click Payments from External Sites").

Figure 12:

FIG. 12 illustrates a simplified web form that may be used to create pay pages. In this example, the pay page creator can specify a referral commission (percentage) for paying associates.

B. Associate Hosting of Pay Boxes (FIGS. 13-16)

The process of enrolling as a pay page associate involves locating an associate-enabled pay page, selecting a pay box associated with that pay page, and then installing the pay box within one or more web pages. Thereafter, whenever a visitor to such a web page clicks on the pay box and makes a payment, the associate typically receives a commission. A given pay page may have an unlimited number of associates. In addition, a given user may become an associate of multiple different pay pages and pay page owners.

FIG. 13 illustrates a page that may be used to search for associate-enabled pay pages. As illustrated, users can search for pay pages based on one or more of the following: name/description, city, and state. Any of a variety of other navigation tools may be provided for locating associate-enabled pay pages, including browse trees in which the pay pages are arranged by category.

FIG. 14 illustrates an example search results page for the search "name or description=Animal Society." This page lists the matching pay pages, and provides links for viewing the pay pages and their associated pay boxes. Where multiple commission rates are supported, the page may also indicate the commission percentages offered by the owners.

Figure 15:
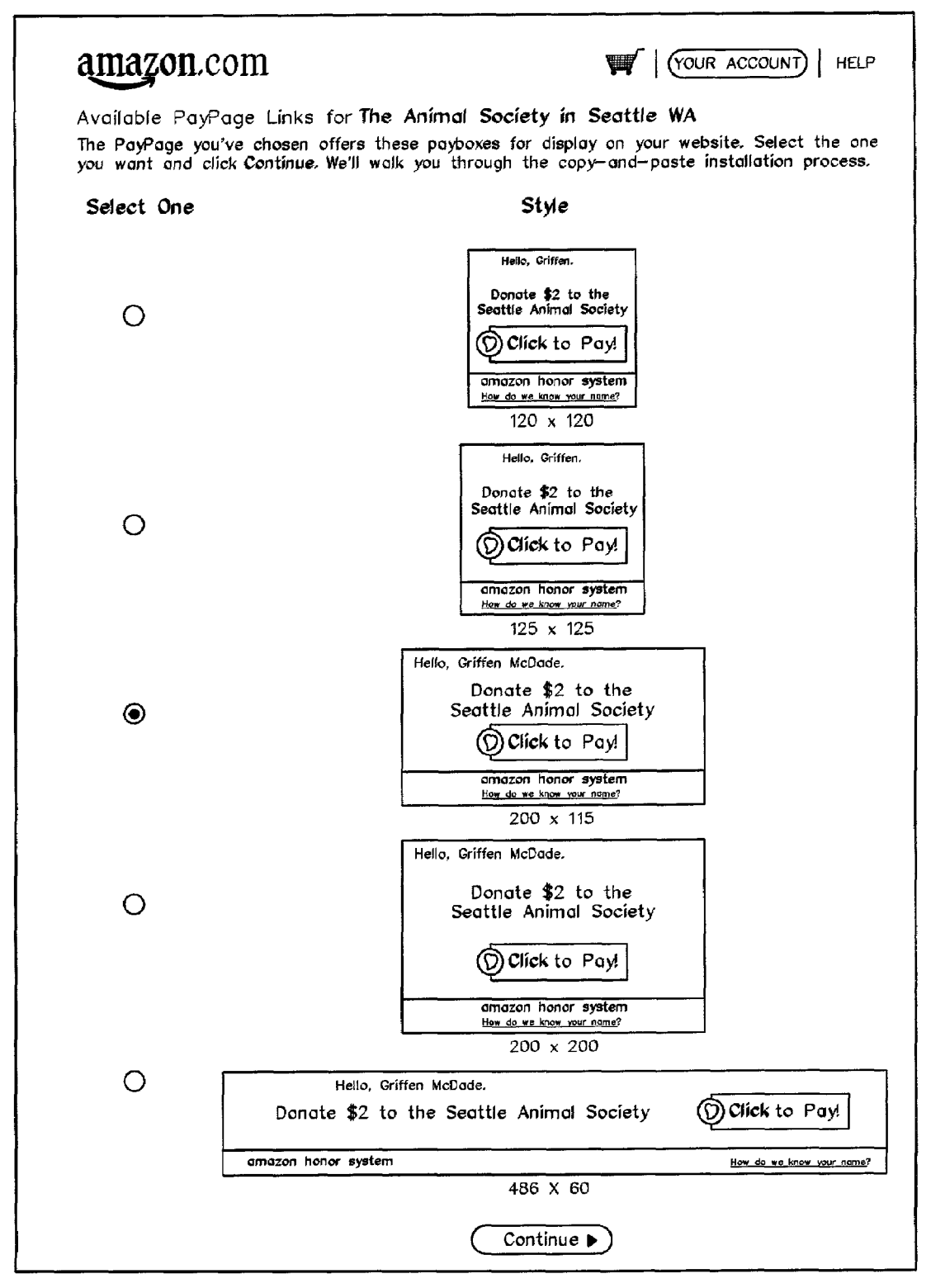
Figure 16:

FIG. 15 illustrates an example page listing the pay boxes that have been defined for the pay page titled "The Animal Society in Seattle, Wash." From this page, the user can select the style of the pay box to host. Upon selection of the "continue" button, the SP site returns a page with the selected pay box style and a sequence of HTML for installing the pay box (FIG. 16). This HTML sequence is similar in form to the sequence in FIG. 10, but includes a unique identifier of the associate (assigned by the pay pages application 76 and stored in the accounts database 72) within the URL of the pay box graphic. As described above with reference to FIG. 3, the pay pages application uses this identifier to determine the identity of the referring associate and to keep track of referral events.

In some embodiments, the associate may be given the option (not illustrated) to define pay page parameters to be used with the associate-hosted instance of the pay box. For example, the associate may be permitted to enter a suggested payment amount, an associate name or logo for co-branding the pay page, and/or a post-payment destination URL. Some or all of these parameters may automatically override the owner-specified parameters associated with the pay box.

Figure 18:
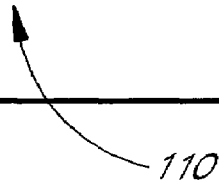
Figure 19:
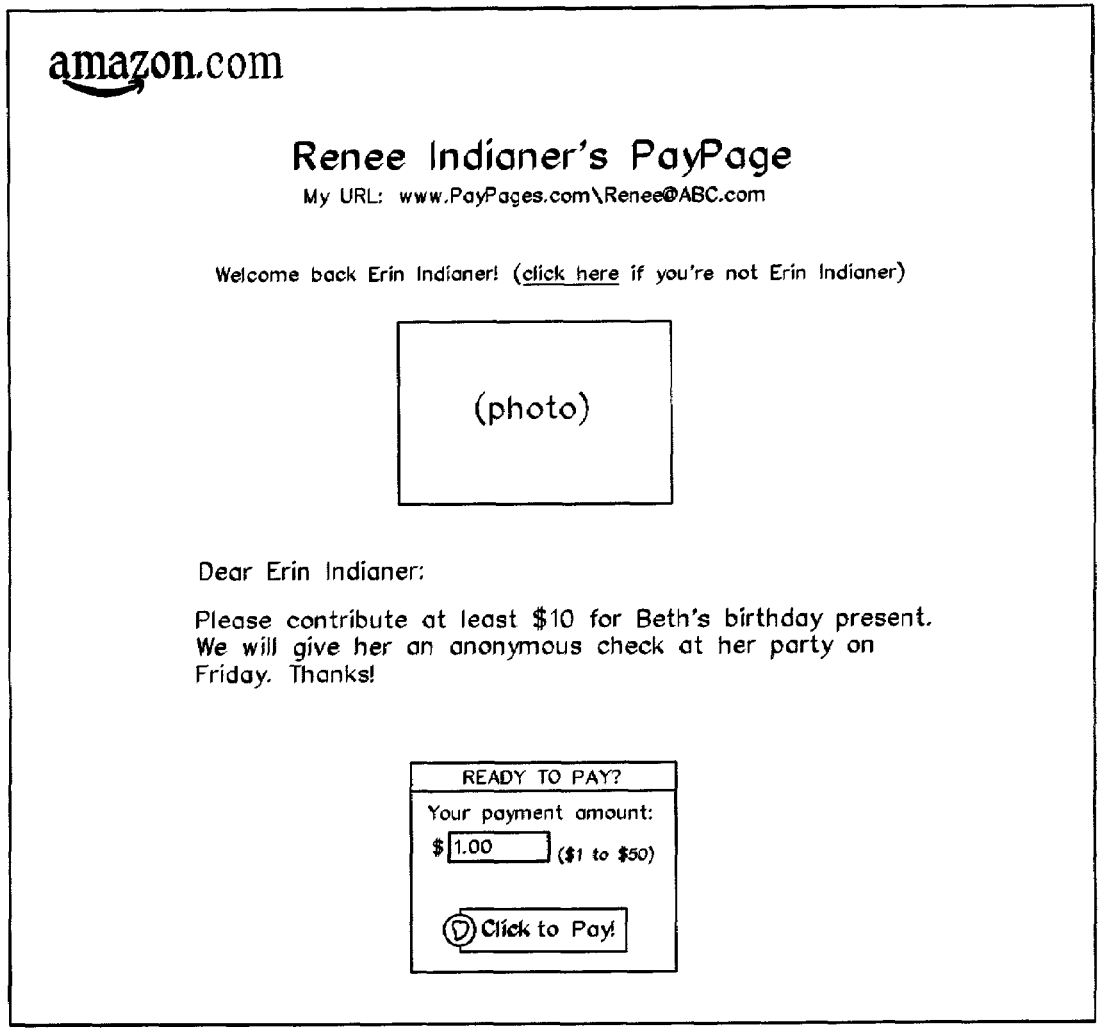

C. Sending a Pavement Request (FIGS. 17-19)

As mentioned above, the payment service may also provide a service for users to send payment requests to other users via customized pay pages. The user preferably initiates a payment request by selecting a pay page to be used for the request (e.g., by selecting a "send payment request" link as shown in FIG. 5). Alternatively, the user could be prompted to select from a list of predefined payment request templates, in which case a new pay page may be created to process the payment request.

Figure 17:
FIGS. 17-19 are screen displays illustrating a feature through which users can request payments from other users via customized versions of existing pay pages.

FIG. 17 illustrates an example page that may be used to send a payment request using a selected pay page. From this page, the user can enter (or select from a personal address book) the names and email addresses of the payers (payment request recipients). In one embodiment, new payers are automatically added to the user's personal address book.

As further illustrated in FIG. 17, the user may also enter an optional description and an optional payment amount, both of which override the description and payment amount (if any) defined within the pay page. Depending upon the type (template) of the pay page used, the user may also be prompted to specify other pay page fields and options (not shown). For example, if the payment request corresponds to a pay page for auction invoices, the user (payee) may also be prompted to enter the name of the winning bidder and the details of the transaction (item number, winning bid, shipping costs, etc).

In the illustrated embodiment, the "send payment request" page also includes a link 108 to a page (not shown) for making the payment request automatic or recurring. For example, the user can specify that the payment request should be re-sent each month, or should be sent automatically to a winning bidder upon completion of an auction.

When the user selects the "send payment request" link, the system 66 stores the submitted form data and sends email messages to each of the listed payers. As illustrated in FIG. 18, this email message includes a hyperlink 110 to the customized version of the selected pay page. The URL portion of this hyperlink (not shown) points to the pay page, and includes one or more parameters for customizing the pay page. These parameters may include the values entered by the pay page owner (e.g., the payment amount), and/or may include identifiers for allowing the pay pages application 76 to look up such values from a table. The use of URLs to pass pay page parameters is discussed separately below in section IV ("Pay Page Templates and Parameters"). When a payment request recipient selects the hyperlink, the system 66 returns the customized pay page as discussed above with reference to FIG. 3.

FIG. 19 illustrates an example pay page used to request donations associated with an event. In this example, the payer is recognized by the system and has the 1-Click service disabled. As mentioned above, pay pages used for other types of payment request scenarios may include other types of fields. For example, a pay page used for requesting payment from the winning bidder in an auction may include fields for the item number, winning bid amount, shipping charges, taxes, and a shipping address; these fields may be populated automatically by the pay pages application 76 in response to successful completion of an auction, or may be filled in by the seller.

IV. Pay Page Templates and Parameters

Pay page templates specify both the "look and feel" and the behavior of the pay pages. In the preferred embodiment, every pay page is based on a template. As mentioned above, templates may be provided by the SP for each of a variety of payment scenarios, such as charitable donations, events, invoices, auctions, rebate requests, and downloads of digital content.

Each template preferably specifies the elements that appear on a pay page. Table 1 below lists and describes the elements that may be included in a template in one embodiment of the invention. The column labeled "type or size" in Table 1 indicates the type or size of the element. The "display on template" column indicates whether the owner sees the element during the pay page creation/editing process (if set to NO, the element takes on the default value specified by the SP). The "edit by creator" column specifies whether the owner/creator can modify the value associated with the element during pay page creation. The "edit by payer" column indicates whether the payer (pay page visitor) can modify the value. The "pass in URL" column specifies whether the element's value can be passed as a parameter with the pay page URL.

TABLE 1

| Element | Description | Type or Size | Display on Template | Edit by Creator | Edit by Payer | Pass in URL |
|---|---|---|---|---|---|---|
| amount | the amount to be paid | currency | Y | Y | Y | Y |
| memo | note passed with payment | 80 | Y | Y | Y | Y |
| anonymous | hide payer's email address from payee | Boolean | Y | Y | Y | N |
| image | url pointer to page image | 120 | Y | Y | N | N |
| page title | Title of the page displayed to the customer and payee | 60 | Y | Y | N | N |
| page name | name of page, used in URLs | 16 | Y | Y | N | N |
| description | User description of themselves, PayPage | 2000 | Y | Y | N | N |
| border-color | Color used for PayPage border | | Y | Y | N | Y |
| thanks_email | Contents of thank you e-mail to be sent to payer | 2000 | Y | Y | N | N |
| thanks_msg | Thank you message from payee to payer after payment has been made | 120 | Y | Y | N | N |
| pay_counter | Type of payment counter, if any | 8 | Y | Y | N | N |
| Pass-Thru | Allow 1-click payments from pay boxes | Boolean | Y | Y | N | N |
| thanks_URL | URL of thank you page | 120 | N | Y | N | N |
| Company-Name | Name of Company | 40 | Y | Y | N | N |
| City | City of organization | 40 | Y | Y | N | N |
| State | State of organization | 40 | Y | Y | N | N |
| page_searchable | allow searching for this page | Boolean | Y | Y | N | N |
| transaction-type | type of transaction | 8 | N | N | N | N |
| e-mail | PayPage owner e-mail | 80 | N | N | N | N |
| name | PayPage owner name | 80 | N | N | N | N |
| event_date | Date of associated event | date | Y | Y | N | N |
| event_time | Time of associated event | time | Y | Y | N | N |
| label1-label6 | data field labels | 80 | Y | Y | N | Y |
| content1-content 6 | data field contents | 80 | Y | Y | Y | Y |
| shipping | shipping and handling amount | 6 | Y | Y | Y | Y |
| tax | tax amount | 6 | Y | Y | Y | Y |
| SKU | sku of item | 32 | Y | Y | N | Y |
| order number | order number | 32 | Y | Y | N | Y |
| addr_name | name | 80 | Y | Y | Y | N |
| addr_line 1 | line 1 of address | 80 | Y | Y | Y | N |
| addr_line 2 | line 2 of address | 80 | Y | Y | Y | N |
| addr_city | city | 80 | Y | Y | Y | N |
| addr_state | state | 80 | Y | Y | Y | N |
| addr_zip | zip | 80 | Y | Y | Y | N |
| addr_country | country | 80 | Y | Y | Y | N |
| charity | PayPage is for a charitable purpose | Boolean | Y | Y | N | N |
| tipping | Template supports tipping | Boolean | N | N | N | N |
| charity_ID | ID of organization (if charity) | 20 | Y | Y | N | N |
| syndicate | Allow page to be syndicated | Boolean | Y | Y | N | N |
| syndicate_fee | Syndicate fee (commission) | % | Y | Y | N | N |
| provider-syndicate_fee | % of the syndicate fee that SP receives | % | N | N | N | N |

Some of the elements, such as the page title, amount, and description fields, are preferably required for all templates. Other elements may be selected at will by the template designer.

The templates may also reference page handlers for performing specific actions. For example, the handler for a rebate template may extract the serial number of the purchased item and determine whether the number appears in a list of valid serial numbers. The handler could also update a database to mark this serial number as "used." In addition, the templates may include Javascript or other code for performing field validation, calculations, or other functions.

For elements that can be passed by URL, a pay page's values may be overridden by parameter values contained within the URL (see block 92 of FIG. 3). These modified values may be specified by a pay box or other link to a pay page (e.g., an overriding suggested payment amount), or by advanced users. In a preferred embodiment, the parameters are passed as name-value pairs and can be passed in any order. For example, a URL specifying the amount, SKU, sale price, tax, and shipping for an item may be of the following form:

http://www.server.com/bob@antiques.com/
?amount=20.00, sku=1234, tax=4.50, shipping=3.50, itemprice=12.00

V. Pay Boxes and SP-Generated Display Objects

Each pay box preferably has a unique identifier that is assigned upon creation by the pay page owner. The identity of the corresponding pay page may be encoded within and determinable from this identifier. This identifier is preferably used by the image server 77 (FIG. 2) to look up the associated pay box specifications from the content database. Some or all of the pay box's specifications, such as the style, color, and a pay page identifier, may alternatively be encoded within the pay box identifier.

There preferably are two URLs associated with each pay box. The first URL is used to serve the pay box graphic, and may, for example, have the following form:

http://www.server.com/payboxes/{pay box ID}.gif

The second URL points to the corresponding pay page, and is used to retrieve the pay page when a user clicks on the pay box graphic. This URL may, for example, have the following form:

http://www.server.com/{pay box ID}

As mentioned above, one or more parameters (such as a suggested payment amount) may be passed with this second URL. The pay box ID is preferably included in the second URL to allow the application 76 to track click-through events on a per-pay-box basis. Requests for the pay box graphic may also be recorded to track the ratio of click-through events to pay box impressions. As described below, historical data regarding impressions (i.e., viewing events), click-through rates, and success (payment) rates, may be provided to the pay page owners.

For associate-hosted pay boxes, the URL formats are the same except that they include an identifier of the hosting associate. For example, the URLs may have the following formats:

http://www.server.com/payboxes/{associate ID}/{pay box ID}.gif http://www.server.com/{associate ID}/{pay box ID}

The associate ID is preferably recorded each time the associate-hosted pay box is requested, and each time the pay page is requested from that pay box. As discussed above, the pay pages application 76 also uses the associate ID to credit an account of the referring associate when an associate-referred visitor makes a payment.

As described above, the pay box URLs and associated HTML coding are generated automatically by the application 76 when a second party (owner) or third party (associate) selects a pay box to host (see FIGS. 10 and 16). Web site developers may alternatively install the pay boxes by manually generating the HTML or other coding.

Figure 20:
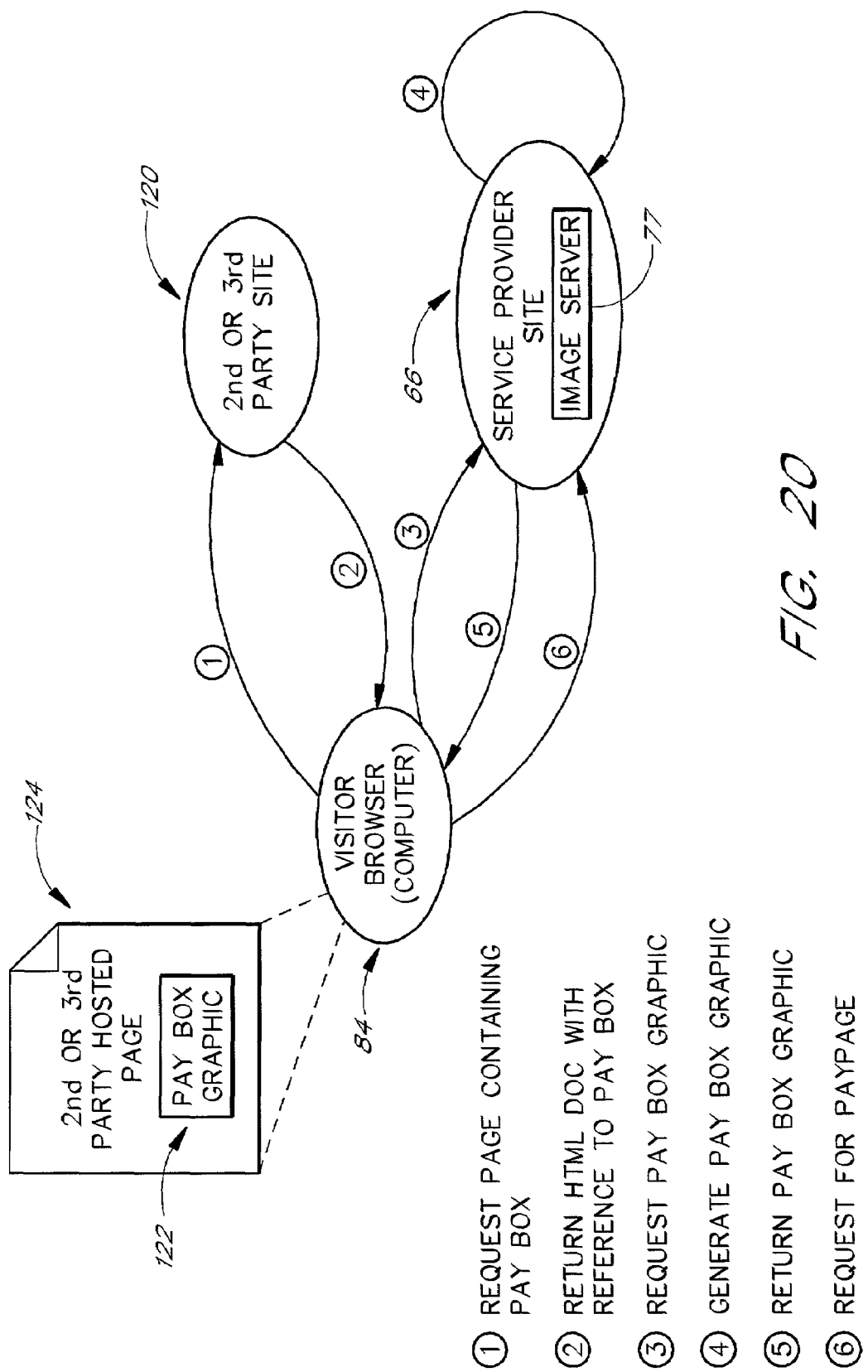
FIG. 20 illustrates a sequence of events that occur when a user requests a web page containing a pay box.

FIG. 20 illustrates the general sequence of events that occur, in one embodiment, when a user (visitor) requests and views an external ($2^{nd}$ or $3^{rd}$ party) web page containing a pay box. The drawing is also illustrative of the method used by the SP site to serve customized display objects other than pay box images. Initially, the visitor's browser 84 transmits a request for the page to the $2^{nd}$ or $3^{rd}$ party site 120 (event 1). The site 120 responds by returning the requested HTML document with the reference to (URL of) the pay box graphic (event 2). Upon parsing the HTML document and detecting this reference, the browser requests the pay box graphic from the SP site 66 (event 3). If the visitor is an existing user of the payment service, this request may include a cookie that can be used by the SP site to look up the name and 1-Click settings of the visitor.

The SP site 66 responds to this request by generating the pay box graphic (event 4), as described with reference to FIG. 3. As part of this process, the image server 77 looks up and/or decodes from the pay box ID the specifications of the pay box. These specifications may include, for example, the pay box size, color, message, and suggested payment amount specified by the pay page owner. In addition, if the request included a valid cookie, the image server 77 looks up the visitor's name and 1-Click settings. The image server 77 uses the pay box specifications and visitor-specific information (if available) to generate the pay box graphic. As described above, the graphic may include the visitor's name, and may include a 1-Click payment button 92F (FIG. 4) if the 1-Click service is enabled. In one embodiment, payers may pre-specify the type or level of customization provided within pay box graphics (see section XIII titled "Payer Preferences for Treatment on External Sites").

The image server 77 could also include other types of personalized information within the graphic, or within another display object. For example, the graphic, or a separate dynamically-generated graphic, could be customized to include selected digits of the visitor's default credit card. In one embodiment, for example, the image server also generates and serves a separate bar which is displayed at the top of the same external web page. This bar preferably contains the name of the visitor (if recognized by the SP site), and information about payments made during the current browsing session. The bar may also include buttons for performing certain functions, such as negating the last payment, or adding an article being viewed to a personal library maintained by the SP.

Further, the pay box graphic or other display object could include personal recommendations of products or services available for purchase from the SP. The personal recommendations may be generated based on user's purchase histories, browsing histories, and/or explicitly-specified interests, using methods that are well know in the art. These personal recommendations, and/or other display attributes of the graphic, could be selected based further on the identity of the hosting site 120. For example, if the hosting site 120 is an online sports shop and the visitor's profile indicates an interest in surfing, the graphic may list surf-related products sold by the SP.

Further, rather than serving a customized graphic, the SP site could serve another type of object selected or customized based on the user's identity, such as a textual link or a streamed audio of video clip. It will also be recognized that the personalized graphic images or other display objects could be pre-generated (generated prior to being requested), and/or cached following to dynamic generation, so that they need not be generated on-the-fly on each request.

As further illustrated by FIG. 20, the image server returns the dynamically generated pay box graphic to the browser (event 5), and the browser displays the graphic 122 within the web page 124. Because the SP site serves the graphic directly to the visitor's browser, the personal information contained in the graphic is not exposed to the external web site or its operator. If the visitor subsequently selects the pay box (e.g., clicks on the graphic), the browser sends a request for the corresponding pay page to the SP site 66 (event 6). As described above, this request may include one or more pay page parameters.

As will be appreciated from the foregoing, the method by which the SP site displays personalized graphics within external sites may be used for a variety of non-payment related applications (e.g., providing personal recommendations or links to related content). Further, the method may be used to serve personalized objects other than images.

VI. Pay box Tracking and Feedback Reports

The pay pages application 76 may provide periodic feedback reports to pay page owners and/or their associates. For owners, the feedback reports may include one or more of the following metrics, shown separately for each of the owner's pay boxes: (a) number of pay box impressions (viewing events), (b) number of pay box click-through events, (c) number of payments resulting from such click-through events, and (d) any resulting commissions. For pay page associates, the periodic feedback reports may include the same metrics (a)-(d), but the data would be provided separately for each pay box hosted by that associate.

To generate the feedback reports, the pay pages application 76 preferably logs the following information each time a pay box is requested by a visitor's browser: (a) the pay box ID; (b) the associate ID, if any; (c) whether the visitor subsequently clicked through (selected) the pay box; (d) whether the click through event resulted in a payment to the pay page owner, (e) the amount of the payment, if any, (f) the amount of the associate commission, if any, (g) the identity of the visitor, if known, and (h) the date and time of the visit. These and other types of information may be extracted from a server access log using well known methods.

In addition to the information listed above, the owner may be provided with data regarding the number of associates that have signed up to host each pay box.

Figure 21:
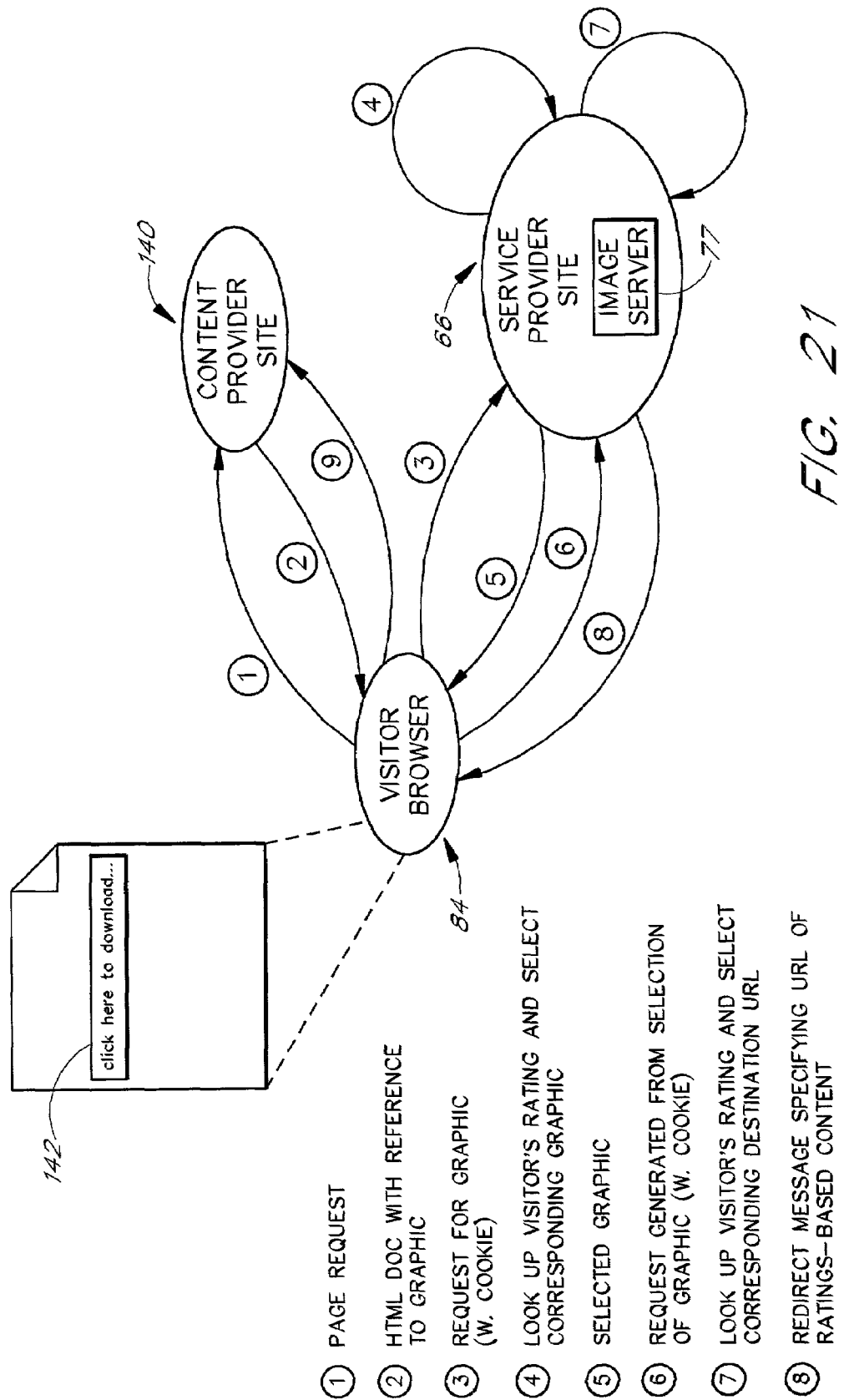
FIG. 21 illustrates a method by which the service redirects users to outside content (typically of the pay page owner) based on the voluntary-payment history of the visitor.

VII. Controlled Access to Content Based on Payment History or Other User Attribute (FIG. 21)

The application 76 may also include functionality for rating payers according to their voluntary payment histories taken over some or all payees. This information may be used to allow pay page owners or other content providers to serve additional content (or take other actions) for "good" payers. For example, a musical artist could provide bonus tracks, or high quality MP3 files, to those having good payment histories.

To generate the ratings, the application 76 may capture the following information for each payer: (1) number of pay pages viewed; (2) number of payments made; (3) payment amount compared to suggested amount (where payment is made); and (4) for the above data, the type of the pay page (charity, honor system, tipping, etc.). Using this data, the application may calculate the payer ratings based on one or more of the following metrics (and possibly additional metrics): (1) pay page views/payment %; (2) total amount paid/total amount suggested (for pages on which payment made); and (3) total amount paid/total suggested (for all pages viewed). The application may also track, and incorporate into the ratings, the number of times the payer viewed a pay box. In addition, the application may generate separate payer ratings for each of several pay page types.

Any of a variety of methods may be used to allow the content provider to server ratings-based content to visitors. One such method involves the use of the SP site 66 to redirect the visitor to ratings-based destinations. With this method, the content provider initially sets up separate destinations (e.g., at respective URLs) for each of multiple payer rating categories, such as "poor," "average," and "good." For example, the content provider could post a sample version of a downloadable music title at the "poor" URL; a standard version of the title at the "average" URL; and an exclusive version of the title (e.g., with bonus tracks or in higher quality audio) at the "good" URL. URLs that are not otherwise accessible from the content provider site (e.g., have no incoming or other links) may be used for this purpose.

The content provider then accesses a "ratings-based content setup" area of the SP site 66 and specifies (1) the URLs of the destinations, and (2) messages to appear on corresponding graphics served by the image server 77. Continuing the example above, the messages may read as follows:

Poor: "Click here to download a sample of Moby's latest single"
Average: "Click here to download Moby's latest single"
Good: "Click here to download Moby's latest CD"

Each such message appears on a different version of a graphic served by the SP site 66. These graphics are preferably separate from the pay box graphics, although a pay box graphic could serve the dual role of providing payment functionality and access to content (e.g., via configurable "thank you page" URLs). The SP site may then generate the HTML or other code for installing the graphic within a web page (as in FIGS. 10 and 16 above). As with pay boxes, another type of display object (animations, etc.) could be used instead of a graphic.

FIG. 21 illustrates the sequence of events that occur when a visitor accesses a page in which the graphic is installed. Initially, the visitor's browser 84 requests, and the content provider site 140 returns, the requested HTML document (events 1 and 2). The browser 84 then sends a request to the SP site 66 for the graphic referenced within this HTML document (event 3). If the visitor is a user of the payment service, this request may contain the visitor's cookie. In response to the request for the graphic, the SP site 66 (image server 77) looks up the visitor's rating and selects the corresponding version of the graphic (event 4). If the visitor in unknown, or no rating exists for the visitor, a default version of the graphic may be selected. The selected graphic 142, which may be either pre-generated or generated dynamically, is then returned to the browser (event 5) and displayed within the web page. If the visitor subsequently clicks on this graphic 142, the browser sends a request for the content to the SP site 66, together with the visitor's cookie (event 6). The SP site responds to this request by looking up the user's rating and the corresponding destination URL (event 7), and then redirecting the browser to this URL (events 8 and 9). One important aspect of this method is that the SP does not expose the visitor's identity or rating to the content provider site.

The method illustrated in FIG. 21 can be varied such that the SP site selects the destination URL based on some user attribute other than voluntary payment history. For example, the SP site could select the destination URL based on whether the user has purchased a particular item (e.g., users who bought a particular CD can access the bonus tracks associated with that CD, while other users can only access samples of such bonus tracks). Another example would be for the SP site to select the destination URL based on whether the user has purchased a subscription from the content provider.

VIII. Payment-Based Access to Content

The pay page and pay box features of the service may also be used to collect payments that are required before external content can be accessed. To provide such functionality, the payment service may support a protocol for notifying a content provider/payee when payment has been received. One example of such a protocol is as follows:

1) Each content provider, when setting up a pay page, provides the SP with the content provider's public key and one or more destination URLs. Each destination URL may, for example, provide access to downloadable or viewable content.

2) When a payment is made by a customer using that pay page (optionally using the single-action payment method described in section X), the amount of sale, the date & time, and/or other transaction information (e.g., e-mail address of customer, IP address of computer making request, etc.) are formatted into a string, and the sting is encrypted with the content provider's public key.

3) The encrypted string is passed by the SP site as a parameter in the destination URL in a redirect message—initially to the visitor's browser and ultimately to the content provider site 140. The string may alternatively be transferred to the content provider site by another communications method.

4) The content provider site decrypts the string and provides access to the customer according to the validity of the extracted information. The content provider may prevent this string from being reused such that the URL serves as a one-time-use URL. The SP does not have to be involved or pass any more information to the content provider at this point.

IX. Display of Payment Counter Data within Pay Pages

As mentioned above, one feature that may be implemented by the service allows pay page owners to display real time payment counter data, such as a goal chart, within their pay pages. This feature may be enabled for certain types of pay pages (e.g., charity and honor system pages), and may be used to convey payment history data to pay page visitors. For example, a pay page for a charitable organization could display a chart showing the amount raised throughout a fundraising event; and a creator of a downloadable work could display the number of visitors who made honor system payments for the work. In both examples, the chart may be in the form of a goal chart showing the real time total relative to an owner-specified goal. The counter may be based on a particular pay page, or on a set of co-owned pay pages specified by the owner.

In one implementation of the feature, the pay page owner is given the option to display a counter indicating (a) the number of payments received, (b) the total of such payments, or (c) both. In addition, the owner may be given the option to display this counter as a goal chart, in which case the owner is prompted to specify a goal value. Where a goal chart is used, the owner may also be able to specify whether payments should continue to be collected once the goal has been reached. Once a counter has been defined, the application 76 updates the counter as payments are received and displays the counter total within the pay page. The total may, for example, be displayed as a bar chart or thermometer showing the amount received relative to the goal.

Any of a variety of other types of historical data could also be displayed within the pay pages. For example, the application could support the ability to display one or more of the following: average payment amount, percentage of visitors who make a payment, and average total commissions earned by associates of the pay page.

Figure 22:
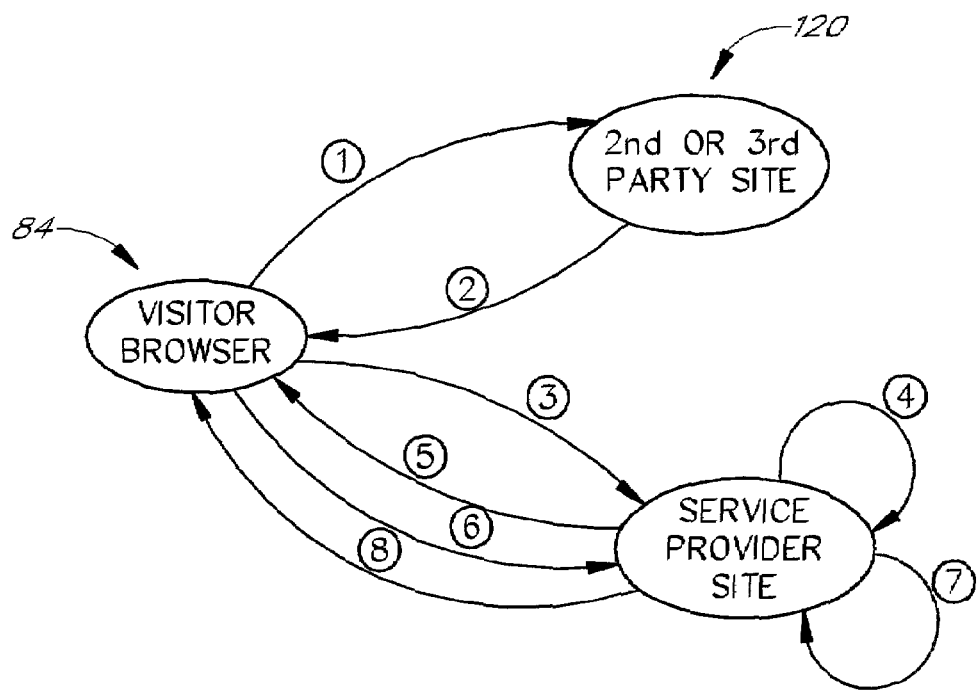
FIG. 22 illustrates a method by which 1-Click users may complete payment transactions directly from externally-hosted pay boxes.

X. 1-Click Payments from External Sites (FIG. 22)

Another feature that may be implemented by the service allows users to make 1-Click (single action) payments directly from externally-hosted pay boxes or other display objects (i.e., without viewing the corresponding pay pages during the payment process). To implement this feature, each pay page may be assigned a "PassThru" property indicating whether 1-Click payments from pay boxes are enabled. The owner may be permitted to specify the page's PassThru setting during creation or editing of a pay page. For pass-through-enabled pay pages, the SP site 66 serves special 1-Click pay boxes to recognized 1-Click visitors. When a visitor selects a 1-Click pay box, the SP site immediately redirects the user to the "thank you" URL pre-specified by the owner (or possibly the hosting associate).

FIG. 22 illustrates this process in further detail. It is assumed in the illustrated example that the user has the 1-Click service turned ON, and that the pay page associated with the requested pay box is pass-through-enabled (has PassThru turned ON). Events 1-3 are the same as in FIG. 20. In response to the request for the pay box graphic (event 3), the SP site 66 determines that the visitor has the 1-Click service turned ON and that the pay page is pass-through enabled. The SP site therefore generates and returns a special 1-Click version of the graphic (events 4 and 5). This graphic includes a 1-Click button or message indicating that selection will complete the transaction. In addition, as described above, the pay box graphic displays the names of the visitor and the payee, and may include other information such as selected digits of the credit card number to be used for the transaction.

Upon selection of the pay box graphic, the browser 84 transmits a request for the pay page together with the user's cookie (event 6). Because the cookie indicates that the user is a 1-Click user, the site 66 responds to this request by (1) executing the transaction according to the visitor's 1-Click settings (event 7), and (2) redirecting the browser to the owner-specified "thank you" URL (event 8). This URL may, for example, be a page of the pay page owner's external web site. The visitor's browser could alternatively be redirected back to the external page from which the payment was initiated, in which case this page may then be displayed with an SP-served display object containing a payment confirmation message (e.g., "you just paid $1 to ContentProvider.com").

Although a special 1-Click version of the pay box graphic is preferably presented to recognized 1-Click users (events 4 and 5 in FIG. 22), a standard graphic or other link could alternatively be displayed to all users (e.g., a button which reads "click here to pay 25 cents"). In such embodiments, the name of recognized visitors could optionally be displayed in some other display object served by the SP site (such as a bar at the top of the web page) for display within the same external web page. In addition, although the pay box graphics in the above examples include text indicating the payment amount, the payment amounts could be conveyed by another method. For example, green, blue and red payment buttons could represent payments of 5 cents, 10 cents, and 25 cents, respectively. Further, a given external web page could include multiple 1-Click pay boxes (e.g., the three color-coded buttons mentioned above) to permit the visitor to select the payment amount.

The method illustrated in FIG. 22 and described above can also be used without requiring payees to have their own pay pages. For example, upon registering with the SP, the payee may be given a unique URL to be used for receiving payments from visitors to external ($2^{nd}$ and/or $3^{rd}$ party) sites. This URL would take the place of the unique pay page URL. For recognized 1-Click visitors, the process would be the same as shown in FIG. 22 and described above (i.e., the visitor would immediately be redirected to a thank you page, etc.). For visitors who are not recognized 1-Click users, selection of the pay box would preferably cause the SP site to return a sign-in page. The user would then sign in (or register, if necessary), and then complete payment via a generic payment pipeline.

It is also contemplated that the service could require that all payments made from external sites be made as 1-Click payments (i.e., users would not be given the option to turn the 1-Click service ON and OFF for purposes of making such payments). In such embodiments, all recognized visitors may be treated as 1-Click users.

XI. Content Distribution Models

As mentioned above, the SP site 66 may implement a service for hosting the downloadable content of pay page owners. The pay page owners may upload such content (optionally together with descriptive text) to a service provider database via a special area of the site. Where such a service is provided, the site may also include functionality for users to search for downloadable content and make voluntary or required payments to the creators. For example, when the search engine returns a product detail page for a downloadable work, the detail page may automatically display the pay box of the creator. The SP site may also allow pay page owners to create links to their own content and embed these links within their own pay pages. For example, the pay page for a novelist may include links to each of his novels as hosted by the SP site.

The SP site 66 may also provide a mechanism for web site operators to (1) locate the content uploaded by pay page owners (e.g., using a search engine), and (2) republish such content on their own web sites together with the pay boxes of the associated pay page owners. To participate in this program, web site operators may be required by online agreement not to republish any content without a corresponding pay box. Upon uploading new content to the SP database, the pay page owners may specify the commissions (if any) they wish to receive.

The SP site 66 may also provide a mechanism for other users to locate the service-provider-hosted content of others, create links to such content, and embed these links within their own web sites. For example, an operator of a music site could search the SP database for music files, and incorporate links to such files (or to the pay pages of their creators) within the music site. As with associate-hosted pay boxes, these links may be generated automatically by the SP site, and may include an associate identifier that allows the SP to track and pay commissions for referrals. Whenever a visitor follows such a link, the site displays the content together with a pay box, pay page, or other entry point into the payment system. With this model, a user who hosts such a link may receive a commission whenever another user follows the link and makes a voluntary or required payment to the owner.

XII. Integration of Payment Service with External Content Provider Site

Figure 23:
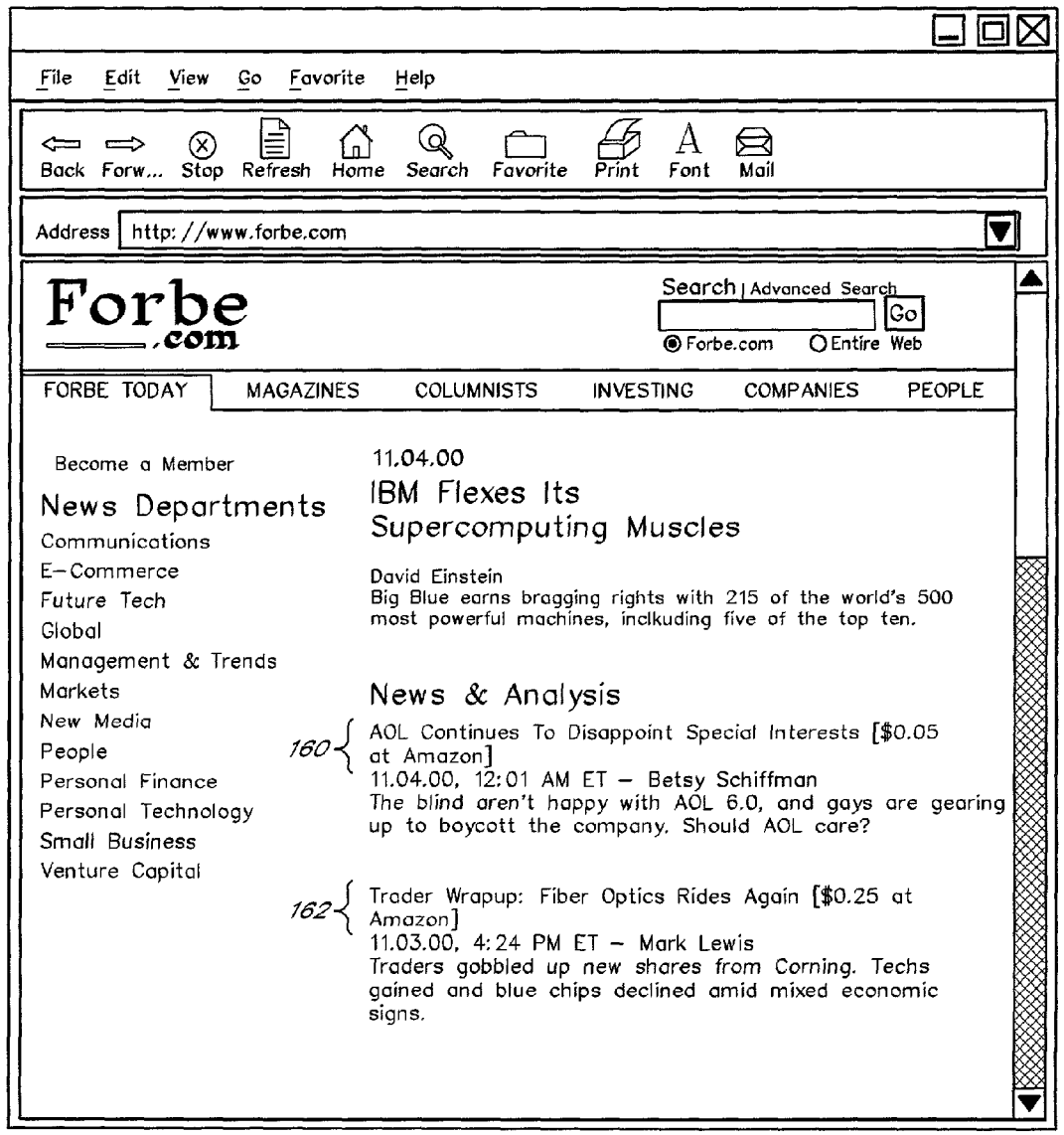
Figure 24:
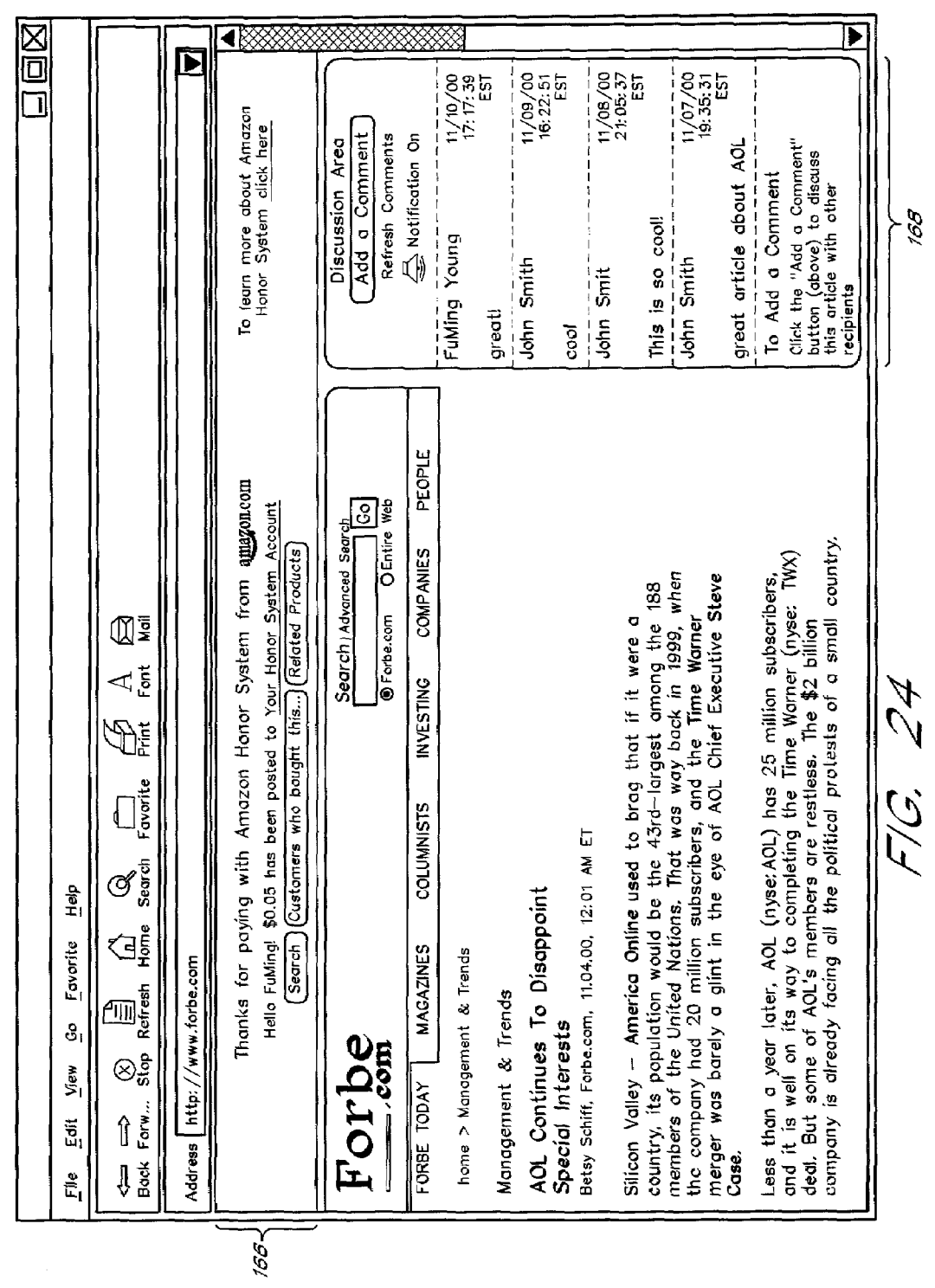

FIG. 23-25 are example screen displays illustrating how some of the above-described features may be used to allow users to make 1-Click, honor system micropayments, and to access other SP services, from an external content provider site. In these examples, the service provider site is the Amazon.com web site.

FIG. 23 illustrates an example, hypothetical web page of the external content provider site "Forbe.com." The external page includes two payment links 160 and 162, each of which is provided in association with a respective article. These links point to the SP site, and preferably to a pass-thru-enabled pay page of Forbe.com.

FIG. 24 illustrates a hypothetical page of the Forbe.com site displayed when a recognized 1-Click user selects payment link 160 in FIG. 23. As mentioned above, all visitors with service provider accounts could be treated as 1-Click users for this purpose. In this example, the SP site responded to selection of the link by charging $0.05 to the account of the visitor, FuMing Young, and by immediately redirecting the visitor to the page on which the article appears (the "story page"). The story page in this example includes a bar 166, and a discussion area box 168, which are dynamically generated and served by the service provider site according to the methods described above. The bar 166 displays a payment confirmation message indicating that $0.05 has been charged to the visitor's account. The bar 166 also includes buttons (links to the SP site) for (a) initiating a search, (b) viewing a listing of items commonly purchased by other users who paid for this article, and (c) viewing related products. The discussion area box 168 allows visitors to view and add comments about the article. Comments added via the discussion area object are stored within a database of the SP site.

FIG. 25 illustrates a story page according to another embodiment. In this embodiment, the bar 166 also includes an "unpay" button for negating the voluntary payment made for accessing the article. When this button 167 is selected, the SP site either (1) cancels the transaction if the payer's credit card has not yet been charged, or (2) refunds the transaction if the credit card has already been charged. The ability to negate or reverse payments in this manner may also be used in other contexts in which users make voluntary or honor system payments, such as those set forth above. In some embodiments of this feature, the payer can only negate the voluntary payment during a particular time duration following that payment. Each payee or content provider may be permitted to specify this time duration via the SP site—optionally separately for each of its pay pages.

In addition, the bar 166 includes an "add to library" button for allowing the visitor to add the article to a personal library maintained on the service provider site. In this example, the "discussion area" box 168 is a drop-down box shown in the dropped-down or "expanded" state.

FIG. 26 is an example page of the SP site describing how content providers can manually add HTML code around their links to "payment-enable" their content (i.e., add payment links of the type illustrated in FIG. 23). This page also describes how the content provider can insert an optional discussion area box 168 within the same external web page as the payment link.

FIGS. 27 illustrates a "paylink creation tool" form that may be provided on the SP site to automatically generate HTML or other coding for adding pay links. Once the user completes and submits the form (including specifying a nickname used for referral tracking), the SP site generates and returns the coding (FIG. 28) to be inserted into the HTML document of the external web page.

XIII. Paver Preferences for Treatment on External Sites

The SP site 66 may also include functionality for payers to pre-specify how they should be treated by the SP when browsing external (second and/or third party) web sites that host pay boxes or other SP-customized content. For example, each payer may have the option, via an account setup area of the SP site, to specify one or more of the following preferences: (a) whether to be identified within pages of external web sites, (b) whether to be shown personal product/service recommendations within external web sites, (c) whether to be shown links to related sites, and/or related content, within external sites, (d) whether to be given access to payer-ratings-based content (see section VII above), (e) whether 1-Click payments may be made from external sites, (f) whether to be shown a running total of payments made to the external site, and (g) whether to be notified when payments made to the external site reach a certain threshold. These and other preferences may be stored in the "user accounts" database 72 (FIG. 2), and used by the SP site to customize pay box graphics and/or other content displayed within the external sites. The payer may also be given the option to set up one or more payment options for handling 1-Click or other payments made from external sites (e.g., all 1-Click payments made on site A should be charged to credit card A, and all 1-Click payments made on site B charged to credit card B).

Although the invention has been described in terms of certain preferred embodiments, other embodiments that are apparent to those of ordinary skill in the art, including embodiments which do not provide all of the features and advantages set forth herein, are also within the scope of this invention. Accordingly, the scope of the invention is defined by the appended claims.

What is claimed is:

1. A computer system that provides a network-based payment service, the computer system comprising:

an electronic data repository that stores account data associated with each of the following: (a) a plurality of users that are registered to make payments via the payment service, (b) a content provider that is registered to use the payment service to collect payments from the registered users for accessing content provided by the content provider, and (c) a web site operator that hosts, on a web site, a payment link that is selectable by the registered users to pay for and access the content provided by the content provider; and a server system coupled to the electronic data repository, the server system operated by a payment service provider that is separate from the content provider and the web site operator, the server system being separate from the web site, and being responsive to selection by a registered user of the payment link on said web site by charging the registered user a fee for accessing the content and by redirecting a web browser of the registered user to the content;

wherein the payment link points to the server system such that selection of the payment link by a user causes a browser of the user to send a request message to the server system, and wherein the server system divides the fee between at least the web site operator and the content provider, such that the web site operator and the content provider each receive a portion of the fee;

wherein the server system includes a web-based payment link generation tool that generates and outputs link coding for adding payment links to web sites that are external to the server system, said payment links including information used by the server system to process payment transactions initiated by users from said external web sites.

2. The computer system of claim 1, wherein the server system causes the web browser to access the content by returning a redirect message to redirect the web browser to an external web location that is separate from said web site and said server system.

3. The computer system of claim 2, wherein the server system hosts a web-based application that provides functionality for the user to specify said external web location, and to associate the external web location with the payment link.

4. The computer system of claim 2, wherein the server system includes an encrypted access string in a target URL portion of said redirect message to enable the external web location to verify that the registered user is authorized to access the content.

5. The computer system of claim 1, wherein the server system processes the selection of the payment link as a single-action transaction, such that the registered user is charged the fee and is provided with access to the content without having to perform any subsequent action.

6. The computer system of claim 1, wherein the server system determines an amount to be paid to the web site operator by calculating a commission that is dependent on the fee.

7. The computer system of claim 1, wherein the server system divides the fee between at least the web site operator, the content provider and the payment service provider.

8. The computer system of claim 1, wherein the web site is an external web site that is not hosted by the server system.

9. The computer system of claim 1, wherein the content is served to the web browser by the server system.

10. The computer system of claim 1, wherein the server system hosts a web-based application that provides functionality for payees to design payment links, and to publish such payment links for web site operators to host.

11. The computer system of claim 10, wherein the web-based application additionally provides functionality for a payee to specify and publish a commission amount to be paid to the web site operators for referrals resulting from the payment link.

12. The computer system of claim 1, wherein the content is an article authored by the content provider.

13. The computer system of claim 1, wherein the server system, by redirecting the web browser to the content, causes the web browser to immediately access the content in response to user selection of the payment link.

14. The computer system of claim 1, wherein the server system includes a web-based interface that enables the content provider to configure the server system with a destination URL for said payment link, said destination URL being a URL of said content.

15. The computer system of claim 1, wherein the web-based payment link generation tool provides an option to specify a payment amount to be associated with the payment link.

16. The computer system of claim 1, wherein the server system dynamically serves a display object of said payment link to browsers of users who access said web site.

17. The computer system of claim 1, wherein the server system uses a cookie transmitted with said request message to identify and charge a user account associated with the registered user.

18. The computer system of claim 1, wherein the server system responds to said selection of the payment link by redirecting the web browser to said content in response to determining that a cookie transmitted with the request message corresponds to a user account to which said fee can be charged.

19. A computer-implemented method for providing user access to content and for allocating user payments for accessing such content, the method provided in association with a link hosted by a first web site of a first entity, said link being selectable by users during browsing of the first web site to pay for and access content, the method comprising:

detecting selection of said link by a user, and in response to said selection: (a) charging the user a fee associated with accessing the content, and (b) redirecting a web browser of the user to a web page that includes or provides access to the content, said web page associated with a second entity, and being part of a second web site that is separate from the first web site; and dividing the fee between at least the first entity and the second entity, such that the first and second entities each receive a portion of the fee;

wherein the method is performed by a networked computer system that implements a payment service, said networked computer system being separate from the first web site and the second web site;

wherein the link points to the networked computer system, such that selection of the link by the user causes a browser of the user to send a message to the networked computer system, and the link comprises link coding generated by a link generation tool hosted by the networked computer system, said link coding comprising information used by the networked computer system to process payment transactions initiated via said payment link.

20. The method of claim 19, wherein the step of redirecting the web browser comprises sending a redirect message from the networked computer system to the web browser.

21. The method of claim 20, wherein the redirect message includes an encrypted access string that, when passed by the web browser to the second web site, enables the second web site to confirm user authorization to access the content.

22. The method of claim 20, wherein the redirect message redirects the web browser to a URL pre-specified by the second entity via a user interface of the networked computer system.

23. The method of claim 19, further comprising allocating an additional portion of the fee to a provider of the payment service.

24. The method of claim 19, wherein the first and second web sites are external to the payment service.

25. The method of claim 19, wherein the web page is served by the networked computer system, and includes or provides access to content uploaded to the networked server system by the second entity.

26. The method of claim 19, wherein the user is charged the fee, and is provided access to the content, solely in response to selection of the link, such that the content is provided to the web browser without the user performing any action subsequent to selection of the link.

27. The method of claim 19, wherein the method is performed without the use of any order or payment processing software on either the first web site or the second web site.

28. The method of claim 19, wherein the networked computer system immediately redirects the web browser to the web page of the second web site in response to the user selecting the link, such that the user does not view any intervening web page.

29. The method of claim 19, wherein the method comprises using a cookie transmitted with said message to identify and charge an account associated with said user.

30. The method of claim 19, wherein the step of redirecting the web browser to said web page is contingent upon a determination by the networked computer system that a cookie transmitted with the request corresponds to a user account to which said fee can be charged.

31. A computer system programmed to perform the method of claim 19.

32. A computer-implemented method for providing fee-based access to content, the method comprising:

generating and outputting link coding for adding a user-selectable payment object to a content provider site operated by a content provider entity, said link coding including information for executing payment transactions initiated via the payment object;

serving the user-selectable payment object to a browser for display on a first web page of the content provider site, said payment object being selectable by a user to access a content page of the content provider site, said content page being separate from the first web page;

receiving a request message generated by said browser in response to user selection of said payment object on the first web page, said request message accompanied by a cookie that corresponds to the user;

responding to the request message by (1) charging a fee to a user account corresponding to said cookie, and (2) redirecting the browser to the content page, such that the user is both charged for accessing, and provided access to, the content page in response to selection of the payment object; and crediting at least a portion of the fee to an account of the content provider;

wherein said serving, receiving, responding and crediting steps are performed by a service provider site that is separate from the content provider site, said service provider site operated by a service provider entity that is separate from, and which collects payments for, the content provider entity.

33. The method of claim 32, wherein the step of redirecting the browser to the content page is performed in response to a determination that the cookie corresponds to a user account to which the fee can be charged.

34. The method of claim 32, wherein the method further comprises the service provider site causing a payment confirmation message to be presented to the user on the content page.

35. The method of claim 32, wherein the method further comprises the service provider site causing the content page to be displayed to the user together with a control for enabling the user to negate payment of the fee.

36. The method of claim 32, wherein the method further comprises the service provider site causing the content page to be supplemented with a discussion area display object that provides functionality for users to post and review comments.

37. The method of claim 32, wherein the method is performed such that the browser does not display any page other than the content page when the user selects the payment object.

38. A service provider site, comprising:

a server system programmed to:

generate link coding that is adapted to be added to at least a first web page of a content provider site of a content provider entity to add a user-selectable payment object thereto, said link coding comprising information for conducting a payment transaction;

serve the user-selectable payment object to a browser for display on the first web page of the content provider site, said payment object being selectable by a user to access a content page of the content provider site, said content page being separate from the first web page;

receive a request message generated by said browser in response to user selection of said payment object on the first web page, said request message accompanied by a cookie that corresponds to the user;

respond to the request message by (1) charging a fee to a user account corresponding to said cookie, and (2) redirecting the browser to the content page, such that the user is both charged for accessing, and provided access to, the content page in response to selection of the payment object; and credit at least a portion of the fee to an account of the content provider;

wherein the service provider site is separate from the content provider site, and is operated by a service provider entity that is separate from, and which collects payments for, the content provider entity.

39. The service provider site of claim 38, wherein the server system is programmed to redirect the browser to the content page in response to determining that the cookie corresponds to a user account to which the fee can be charged.

40. The service provider site of claim 38, wherein the server system is further programmed to cause a payment confirmation message to be presented to the user on the content page.

41. The service provider site of claim 38, wherein the server system is further programmed to cause the content page to be displayed to the user together with a control for enabling the user to negate payment of the fee.

42. The service provider site of claim 38, wherein the information for conducting the payment transaction comprises an identifier of the content provider entity.

43. The service provider site of claim 38, wherein the server system comprises computers that are geographically remote from each other.

* * * * *